United States Patent
Alyuz Civitci et al.

(10) Patent No.: US 11,908,345 B2
(45) Date of Patent: Feb. 20, 2024

(54) ENGAGEMENT LEVEL DETERMINATION AND DISSEMINATION

(71) Applicant: Intel Corporation, Santa Clara, CA (US)

(72) Inventors: Nese Alyuz Civitci, Hillsboro, OR (US); Cagri Cagatay Tanriover, Bethany, OR (US); Sinem Aslan, Istanbul (TR); Eda Okur Kavil, Portland, OR (US); Asli Arslan Esme, Istanbul (TR); Ergin Genc, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1185 days.

(21) Appl. No.: 16/234,255

(22) Filed: Dec. 27, 2018

(65) Prior Publication Data
US 2020/0135045 A1    Apr. 30, 2020

(51) Int. Cl.
*G09B 19/00*    (2006.01)
*G09B 5/08*    (2006.01)
(Continued)

(52) U.S. Cl.
CPC ............ *G09B 5/08* (2013.01); *G06F 18/256* (2023.01); *G06V 40/161* (2022.01);
(Continued)

(58) Field of Classification Search
CPC .................................................. G09B 19/00
See application file for complete search history.

(56) References Cited

U.S. PATENT DOCUMENTS

| 8,682,241 B2 * | 3/2014 | Huerta | G09B 7/00 |
| | | | 434/362 |
| 8,943,526 B2 * | 1/2015 | Rivera | H04N 21/4532 |
| | | | 725/12 |

(Continued)

FOREIGN PATENT DOCUMENTS

EP    3361467 A1 *    8/2018    ........... A61B 5/0205

OTHER PUBLICATIONS

Jacob Whitehill, Zewelanji Serpell, Yi-Ching Lin, Aysha Foster, and Javier R. Movellan, The Faces of Engagement: Automatic Recognition of Student Engagement from Facial Expressions, 2013. (Year: 2013).*

(Continued)

*Primary Examiner* — Kurtis Gills
(74) *Attorney, Agent, or Firm* — Schwegman Lundberg & Woessner, P.A.

(57) ABSTRACT

Various systems and methods for engagement dissemination. A face detector detects a face in video data. A context filterer determines a student is on-platform and a section type. An appearance monitor selects an emotional and a behavioral classifiers. Emotional and behavioral components are classified based on the detected face. A context-performance monitor selects an emotional and a behavioral classifiers specific to the section type, Emotional and behavioral components are classified based on the log data. A fuser combines the emotional components into an emotional state of the student based on confidence values of the emotional components. The fuser combines the behavioral components a behavioral state of the student based on confidence values of the behavioral components. The user determine an engagement level of the student based on the emotional state and the behavioral state of the student.

26 Claims, 12 Drawing Sheets

(51) Int. Cl.
*G06V 40/16* (2022.01)
*G06F 18/25* (2023.01)

(52) U.S. Cl.
CPC .......... *G06V 40/171* (2022.01); *G06V 40/172* (2022.01); *G06V 40/176* (2022.01); *G09B 19/00* (2013.01)

(56) References Cited

U.S. PATENT DOCUMENTS

| | | | | |
|---|---|---|---|---|
| 9,767,349 | B1* | 9/2017 | Shreve | G06V 40/174 |
| 9,843,768 | B1* | 12/2017 | Negi | H04N 7/15 |
| 10,013,892 | B2* | 7/2018 | Aslan | G09B 5/08 |
| 2009/0068625 | A1* | 3/2009 | Petro | G09B 1/00 |
| | | | | 434/167 |
| 2012/0052476 | A1* | 3/2012 | Graesser | G09B 7/04 |
| | | | | 434/362 |
| 2012/0317501 | A1* | 12/2012 | Milou | G06Q 10/101 |
| | | | | 715/753 |
| 2014/0267555 | A1* | 9/2014 | Shane | H04N 7/15 |
| | | | | 348/14.07 |
| 2015/0024817 | A1* | 1/2015 | Hawkins | A63F 13/47 |
| | | | | 463/9 |
| 2016/0203726 | A1* | 7/2016 | Hibbs | G09B 7/02 |
| | | | | 434/308 |
| 2017/0358232 | A1* | 12/2017 | Adams | A61B 5/1118 |
| 2019/0108578 | A1* | 4/2019 | Spivack | G09B 5/065 |
| 2019/0228673 | A1* | 7/2019 | Dolsma | G16H 50/30 |

OTHER PUBLICATIONS

"OnTask", Retreived from internet: https://www.ontasklearning.org/, (Accessed on Apr. 11, 2019), 6 pgs.

"The 2 Sigma Problem: The Search for Methods of Group Instruction as Effective as One-to-One Tutoring", Educational Researcher, 13(6), 4-16. doi: 10.2307/1175554, (1984), 2 pgs.

"The Student Relationship Engagement System—Empowering teachers since 2012", Retrieved from the internet: https://sres.io/, (Accessed on Apr. 11, 2019), 4 pgs.

Ez-Zaouia, Mohamed, "Emoda: a Tutor Oriented Multimodal and Contextual Emotional Dashboard", Retrieved from internet: https://tinyurl.com/y7ongsxy, (Accessed on Apr. 11, 2019), 10 pgs.

* cited by examiner

FIG. 8C

FIG. 9

ENGAGEMENT LEVEL DETERMINATION AND DISSEMINATION

TECHNICAL FIELD

Embodiments described herein generally relate to processing techniques used to identify and provide engagement data using interconnected devices using device networks in an adaptive learning environment.

BACKGROUND

Providing real-time learning analytics to teachers facilitates the teachers' support to students in classrooms and may improve student engagement, experience, and performance. Engagement is an important affective state for teachers to consider when personalizing learning experience, as engagement is linked to major educational outcomes such as persistence, satisfaction, and academic achievement.

Research investigating students' engagement in learning tasks may be based on uni-modal intelligent systems relying on data collected from student interactions and event logs. One of the criticisms of such research is that a human tutor is still better at understanding students' engagement states since a human tutor uses a multi-modal approach: leveraging students' appearance, e.g., body language, in addition to other contextual cues to make better judgments about their engagement states. Such a uni-modal intelligent system may be improved upon using a multi-modal approach rather than a uni-modal approach.

BRIEF DESCRIPTION OF THE DRAWINGS

The present disclosure is illustrated by way of example and not limitation in the figures of the accompanying drawings, in which like references indicate similar elements and in which:

FIGS. 8A-8C illustrate orientations of facial landmarks in a two-dimensional scene according to some embodiments;

FIG. 9 illustrates corrected facial landmarks according to some embodiments;

The following description refers to the accompanying drawings. The same reference numbers may be used in different drawings to identify the same or similar elements.

In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DESCRIPTION

Described herein are adaptive learning environments that use a multi-modal approach. The multi-modal approach may leverage student appearance and interaction logs as two modalities to detect engagement in real-time. The detected engagement may be based on behavioral and emotional student engagement states. The detected engagement for each student may then be presented in real-time using a dashboard. The dashboard allows a teacher to implement just-in-time personalized interventions. Accordingly, students may be given 1-to-1 individualized tutoring as needed.

In various embodiments, a multi-componential perspective for engagement and operationalized engagement in terms of affective, cognitive, and behavioral states is used. Towards addressing this multi-componential perspective, multi-modal classifiers for two dimensions of the overall engagement were trained. One classifier was for behavioral engagement (e.g., whether a student is on-task or off-task during learning) and one classifier was for emotional engagement (e.g., whether a student is satisfied, bored, or confused during learning).

In some embodiments, for both engagement dimensions, two modalities were used: (1) Appearance modality, which refers to the outward appearance presented by the student, is based on video of individual students captured by built-in device cameras; and (2) Context-Performance modality, which uses contextual and student-specific performance data provided by the educational content platform. Features from both of these modalities are extracted to enable real-time detection of both behavioral and emotional engagement. After determining engagement for students, the engagement levels for each student may be presented in a dashboard format to quickly show any student that may need intervention.

Figure 1:
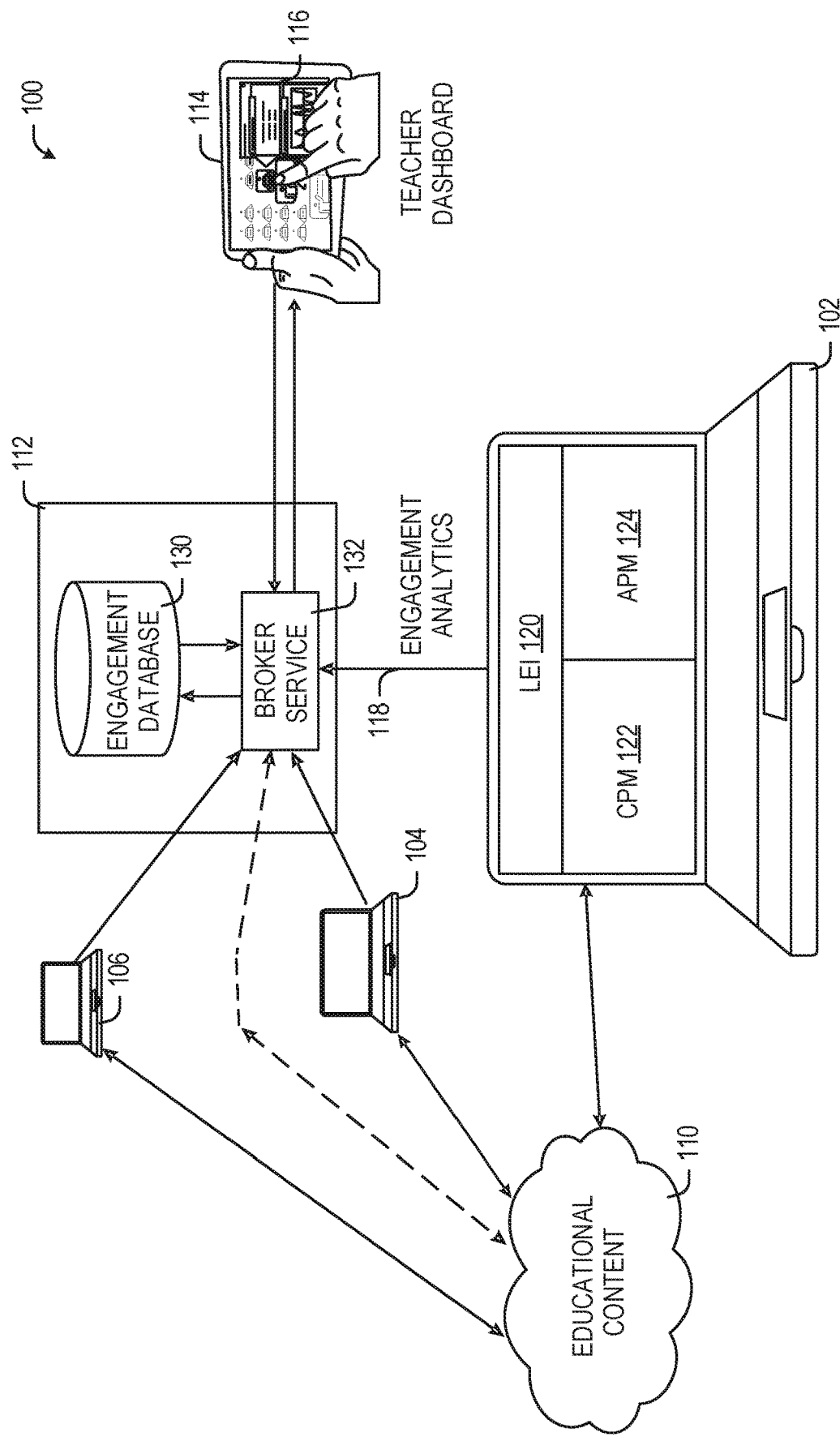
FIG. 1 illustrates an engagement determination system with a local learning engagement interface (LEI) according to some embodiments.

FIG. 1 illustrates an engagement determination system 100 with a local learning engagement interface (LEI) according to some embodiments. A laptop 102 may include a camera. The laptop 102 may be connected to educational content 110, such as Khan Academy. Additional laptops 104 and 106 may also be connected to the educational content 110. The laptops 102, 104, and 106 may be part of a classroom. In an example, each student uses their own laptop, such as laptops 102, 104, and 106. While laptops 102, 104, 106 are illustrated in FIG. 1, it is understood that any type of user device may be used including, but not limited to, tablets, mobile phones, laptops, hybrid devices, or the like.

The laptop 102 may also be connected to another service 112 (e.g., a cloud service) that collects data from each student. The teacher in the classroom is provided a client device 114 (e.g., a tablet) to access the real-time engagement results/states of each student as well as the entire class on demand. A teacher dashboard 116 may be displayed on the client device 114.

In the system 100, engagement analytics 118 are calculated at the network edge on each student's laptop. In order to calculate the engagement analytics 118, each laptop 102, 104, 106 may include a learning engagement inference (LEI) 120 as well as a context & performance monitoring (CPM) interface 122 and an appearance monitoring (APM) interface 124. The CPM 122 keeps track of how the student is interacting with the educational content 110. The CPM 122 extracts statistical features related to time (e.g., how much time is spent on watching a video or solving questions), to content in general (e.g., difficulty level), or to performance related information (e.g., number of hints taken, number of attempts made towards solving the question), etc. The APM 124 keeps track of the facial expressions, head movements as well as the upper body pose of the student. The APM 124 tracks the facial landmarks to extract statistical features related to head and body movements, as well as expressions. The LEI 120 combines the output of the APM 124 and the CPM 122 to calculate the final engagement analytics 118. The engagement analytics 118 may be sent to the cloud service 112, (e.g. in real-time). The engagement analytics 118 may be stored in an engagement database 130 that is accessible via a broker service 132.

The LEI 120 may use machine learning approaches and may have at least two tasks. First, the LEI 120 infers engagement levels using modality-specific information. For example, if the APM 124 provided appearance related features, then an engagement inference is run using only these features. If the CPM 122 also provides features, then a separate engagement inference is run on context-performance features. Secondly, the LEI 120 decides on which inference output(s) to use. If only one modality is available (i.e., either appearance or context & performance), that modality output is utilized. If both are available and there is no agreement among them, the LEI 120 may use confidence values computed by the inferences over the two modality-specific components (the APM 124 and the CPM 122) outputs to choose the more confident output.

The teacher dashboard 116 may request and receive engagement results from the engagement database 130 via the broker service 132. The teacher dashboard 116 may then be updated with the requested engagement results.

Figure 2:
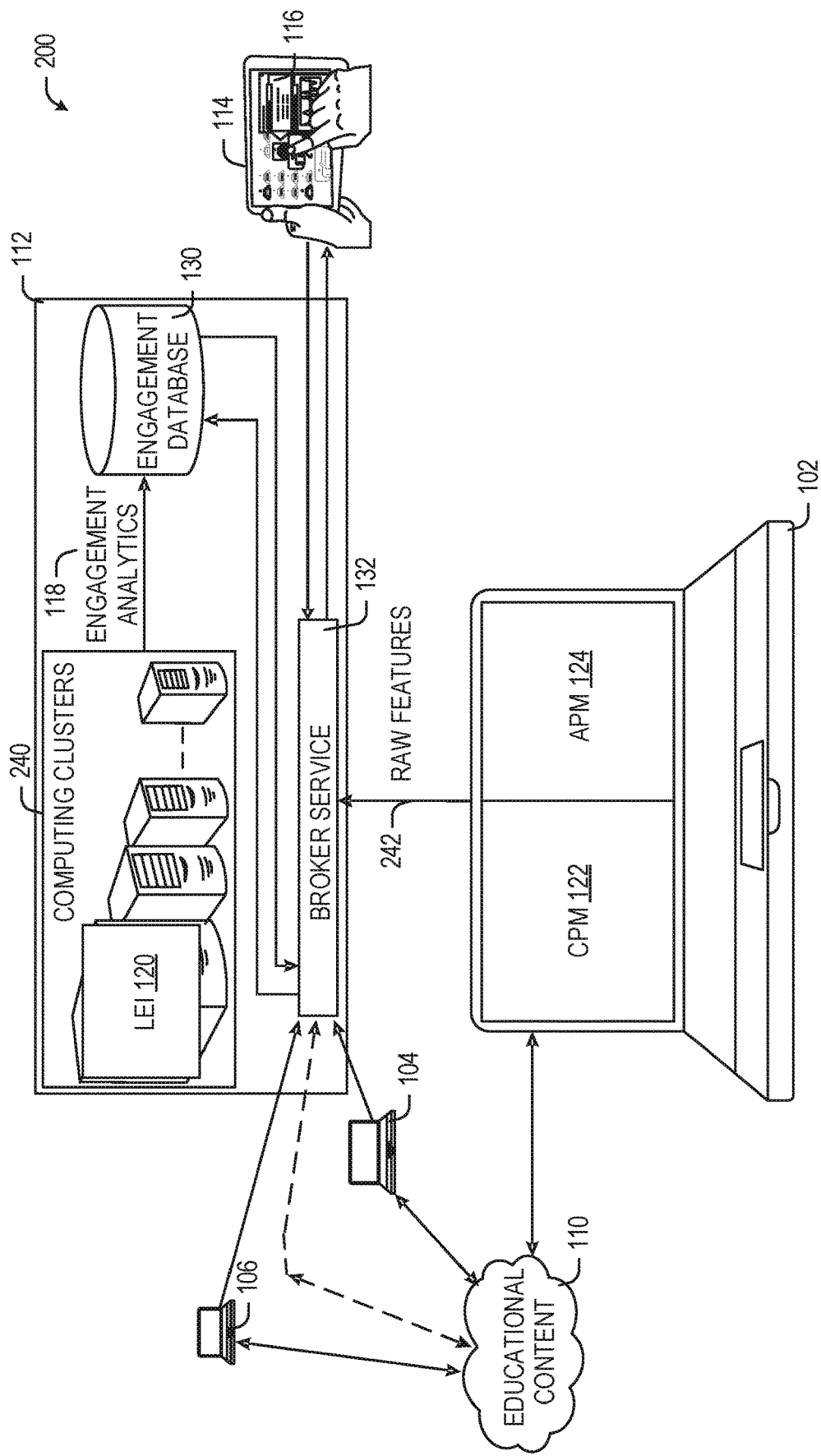
FIG. 2 illustrates an engagement determination system with a remote learning engagement interface according to some embodiments.

FIG. 2 illustrates an engagement determination system 200 with a remote learning engagement interface according to some embodiments. In FIG. 2, the LEI 120 is located at the cloud service 112 rather than the student laptop 102. Accordingly, the calculation of the engagement analytics 118 may be done at a computing cluster 240 on the cloud service 112. The APM 124 and the CPM 122 outputs may be delivered in raw form 242 to the cloud service 112 where the outputs are processed by the LEI 120 in order to calculate the engagement analytics 118. The teacher dashboard 116 is agnostic to the where the LEI 120 is located and may work in exactly the same way in both options.

Moving the LEI 120 to remote computing clusters 240 on the cloud service 112 allows cost effective, thin-client laptops 102, 104, 106 to be used at the edge because the computational overhead is significantly reduced on each student laptop 102, 104, 106. Using such laptops will reduce the total cost of ownership for schools that deploy the described personalized learning system. Machine learning models inside the LEI 120 may be improved and updated to enhance the accuracy of the engagement analytics delivered to the teacher. When the LEI 120 is upgraded, the upgrade may be done seamlessly on the cloud service 112 without having to upgrade the software on each student laptop 102, 104, 106. Such an update scheme reduces maintenance costs of the system. The computational complexity of the machine learning models inside the LEI 120 may be increased (to improve performance further) without having to worry about any workload changes at the edge devices. This provides an important advantage in terms of scalability.

Figure 3A:
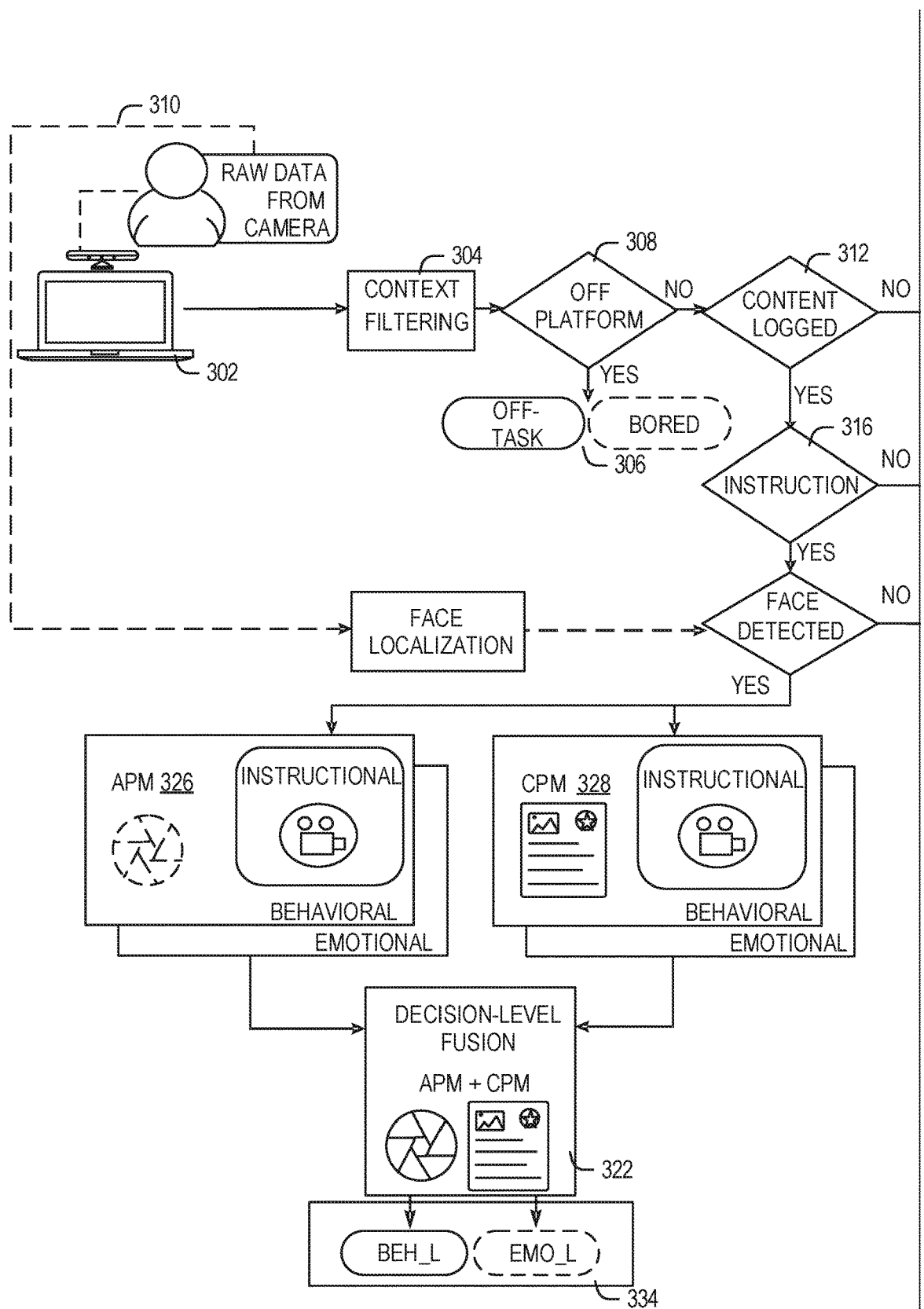
FIGS. 3A and 3B illustrate model selection and decision fusion flow for a LEI according to some embodiments.
Figure 3B:
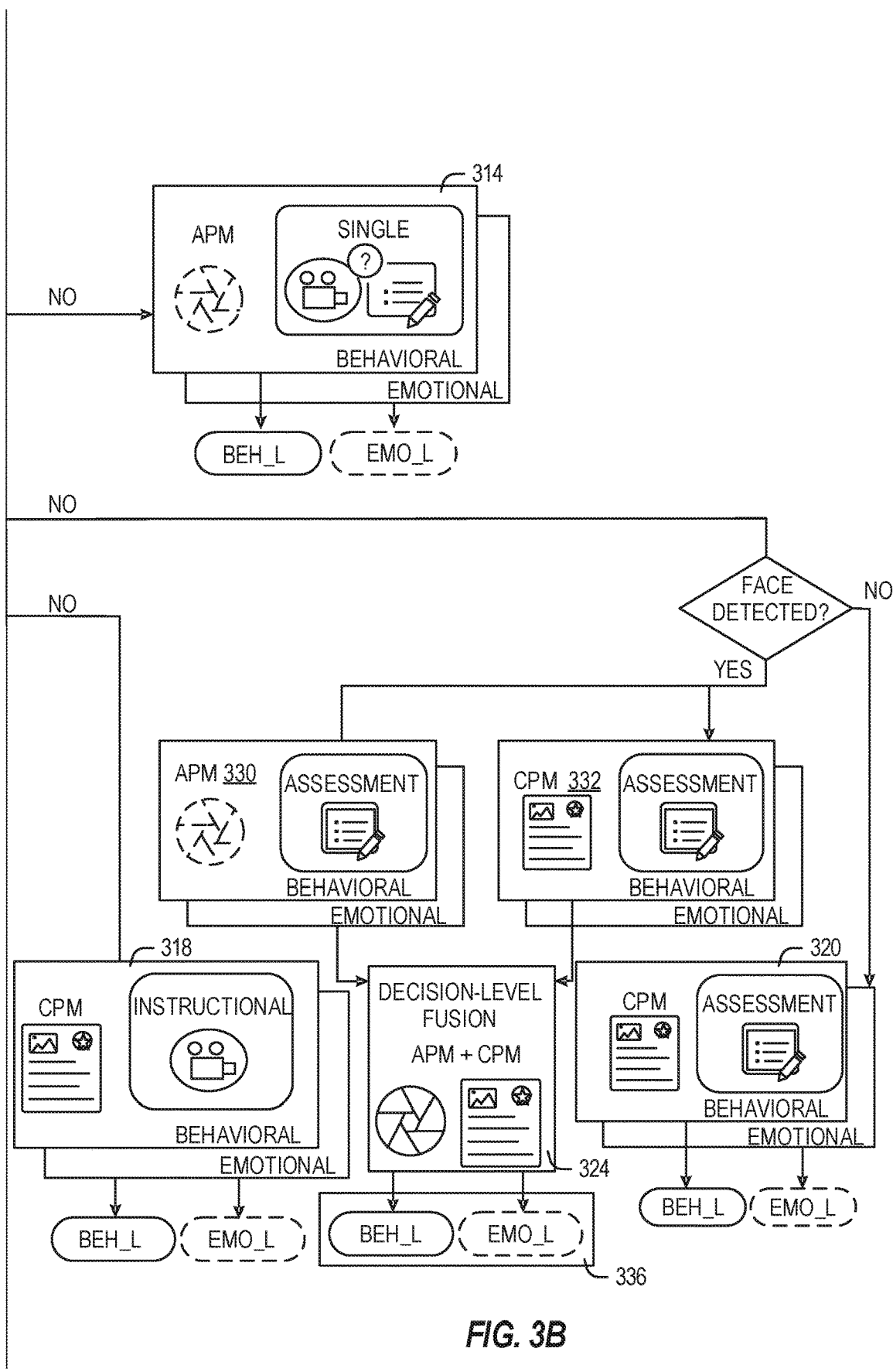

FIGS. 3A and 3B illustrate model selection and decision fusion flow for a LEI according to some embodiments. Embodiments use two different types of classifiers: a behavioral engagement classifier and an emotional engagement classifier. The behavioral engagement classifier detects if the student is actively engaged in a learning task. In an example, the behavioral engagement classifier detects if a student is On-Task or Off-Task during learning. The emotional engagement classifier detects various student emotional states, such as being bored, confused, satisfied, happy, during teaching. In an example, the emotional engagement classifier detects if a student is Bored, Confused, or Satisfied during learning. In an embodiment, the classifiers are able to output one behavioral and one emotional engagement state every 4 seconds, using the data of the previous 8 seconds. The empirical time window may vary while meeting the real-time operation requirement. In addition, the engagement framework may track through the system logs (i.e., web browser logs, application status logs) whether the student is logged onto the system and actively using it. This is the contextual state of the student, and the contextual state may be On-Platform (student is logged in and the related browser window is visible/active) or Off-Platform (either the student is not logged in or the browser window is not the application "in focus" or "in the foreground"). The contextual state may be obtained using a rule-based approach by jointly checking the browser and the system logs. The overall engagement state is then defined as a direct mapping from these three types of engagement information. The mapping used for overall engagement is given in Table 1.

TABLE 1

| Contextual State | Behavioral State | Emotional State | Engagement Mapping |
|---|---|---|---|
| On-Platform | On-Task | Satisfied | Engaged |
| On-Platform | On-Task | Bored | Maybe Engaged |
| On-Platform | On-Task | Confused | Maybe Engaged |
| On-Platform | On-Task | Cannot Decide | Maybe Engaged |
| On-Platform | Off-Task | | Not Engaged |
| Off-Platform | | | Not Engaged |

The overall flow for the model selection and decision fusion is shown in FIGS. 3A-3B. In an embodiment, there are separately trained classifiers for different learning tasks or section types (e.g., Instructional, when students are watching instructional videos; and Assessment, when students are solving questions) as specific tasks may have an effect on how behaviors and emotions are elicited. This section-type specialization of classifiers are valid for both of the modality-specific components (e.g., APM and CPM). If the relevant data is available, the output from the APM and CPM components are fused together to create an engagement level value.

In FIG. 3A, the contextual state is identified via the URL logs using the rule-based mechanism. The contextual state determines if a student is using an online learning platform 308 or is not using the online learning platform 308. For example, context filtering 304 may take URI, logs from a student laptop 302 and determine if the student is accessing the online learning platform 308. In an example, URL logs may be part of a web browser log, in some examples, URL logs for a web browser may only be used when the web browser is the foreground application on the user's laptop. Certain websites or URLs may be identified as being on platform within an on-platform list. Any URL or website not within the on-platform list may be considered off-platform. Other logs, such as system or application logs may be used to determine the contextual state. If the student is Off-Platform, the Behavioral and Emotional states are determined to be Off-Task and Bored 306, respectively.

If the student is On-Platform, then the presence of content platform logs are checked 312. If absent, the section type is unknown and, in an embodment, only the APM component is active 314 in FIG. 3B. If the content platform logs are present, then the section type is checked 316. The models specific to the section type are employed for both APM and CPM components. The section type may be instructional or assessment.

Camera data 310 may be used to determine if the appearance monitoring (APM) may be used. As described in greater below, the camera data 310 is analyzed to determine if there is a face detected in the camera data 310. If there is no camera data 310 or no face is detected, the CPM component by itself may be used to determine the engagement level of a student for both assessment 318 and instructional 320 section types.

If for either section type, both modalities are available, then the final behavioral and emotional states are predicted by fusing using learning engagement inference components 322 and 324 the decisions of two modality-specific models 326 and 328 or 330 and 332. In an embodiment, the confidence values generated by models 326, 328, 330, and 332 (e.g., a confidence vector where each item corresponds to the confidence for each state) are used to fuse the output from the CPM and APM models 326, 328, 330, and 332 into an engagement indicator. A fused confidence vector 334 and 336 may be computed as the element-wise mean of the two vectors. Then, the final state is selected as the one with the highest confidence.

The engagement level determination includes determining if a user's face may be determined. Facial data may be used in the APM component. When facial data is not available, the CPM component may be used without output from the APM component.

In an example, the CPM and APM components use classifiers to determine an emotional state, a behavior state, or both states. The classifiers may be trained using previously logged data. In an example, log data and camera data of students accessed education content was collected. The data set contained 350 hours of data of 48 students. The data was labeled with behavioral and emotional labels. Features used in the CPM and APM components were extracted from the data set. In an example, the features were extracted from 8 seconds of data, with an overlap of 4 seconds in between. This windowing was also applied to the labels to obtain labeled instance set for the data for each student's data.

The training data also contained learning task labels that identified whether the student was watching an instructional video (instructional) or solving exercise questions (assessment). In some examples, a third learning task label, unknown, was used to indicate that the learning task was unknown or unavailable.

In an example, a classifier for each combination of learning task, dimension (behavioral or emotional), and modularity (APM or CPM), was trained using the training data. The training data sets for each classifier was obtained by retrieving relevant data (features and labels) from the training data. Table 2 below shows a list of classifiers that were trained in an example.

TABLE 2

| Engagement Dimension | Modality | Learning Task | Acronym |
|---|---|---|---|
| Behavioral | Appearance | Instructional | Beh_Appr_Instructional |
| Behavioral | Appearance | Assessment | Beh_Appr_Assessment |
| Behavioral | Appearance | Unknown | Beh_Appr_Unknown |
| Behavioral | Context-Performance | Instructional | Beh_CP_Instructional |
| Behavioral | Context-Performance | Assessment | Beh_CP_Assessment |
| Emoti onal | Appearance | Instructional | Emo_Appr_Instructional |
| Emotional | Appearance | Assessment | Emo_Appr_Assessment |
| Emotional | Appearance | Unknown | Emo_Appr_Unknown |
| Emotional | Context-Performance | :Instructional | Emo_CP_Instructional |
| Emotional | Context-Performance | Assessment | Emo_CP_Assessment |

In an example, an engagement level is determined using, based on the learning task, the relevant pre-trained classifiers. For example, if a student is solving a question, four pre-trained classifiers for the Assessment are used: Beh_Appr_Assessment, Beh_CP_Assessment, Emo_Appr_Assessment, and Emo_CP_Assessment. Since both modality-specific classifiers provide output for each of the engagement dimensions, the decisions are fused using the confidence values: The decision of the more confident modality is assigned as the final label. The final labels obtained by fusion for Behavioral and Emotional engagement are then mapped to the overall Engagement (as in TABLE 1 above).

In an example, the CPM component uses various data from URL access logs, systems logs, educational content logs, etc. Input that may be provided to the CPM includes:
Start Time: A timestamp that provides the start time that this particular log is associated with.
End Time: A timestamp that provides the end time that this particular log is associated with.
Gender: This is the gender of the student to whom information in this log corresponds.
Session Type: This field may be either "Assessment" or "Instruction." Assessment session is where the student is solving practice exercises while "Instruction" refers to instructional video watching events.
Session Identifier: An identifier that refers to a particular instructional video or a particular educational topic.
Question Number: If the student is in "Assessment" section, this field will indicate a question number that the student is attempting to solve.
Trial Number: A question may be attempted multiple times and each attempt is referred to as a trial. This field indicates how many times a question has been attempted so far.
Event: This field may have the following values: "instructional", "attempt" or "hint". The first value is applicable if the student is watching an instructional video (i.e. Session Type="Instructional"). The latter two is for "Assessment" sessions and if the student is requesting additional information to solve the question, the assigned value is "hint". If the student tried to answer the question, the value is "attempt".

Duration: For "Instructional" sessions, this field gives the number of seconds a student has watched a video for. If the student is in "Assessment" session, the duration may indicate the time spent on an attempt to solve the question or a hint where further information is provided to assist.

The CPM component may use the input to extract a set of features for use in training and prediction. Features that may be extracted include:

Grade: This feature may be calculated using the number of successful attempts for a given topic under assessment.

TrialNoFromBeg: This feature is the number of trials to a number of questions within a particular time window. The time window may be specified in various ways such as "the first 'X' minutes of the classroom session".

NumFailedFirstAttemptsFromBeg: This gives the number of unsuccessful first attempts to each question within a particular time window. The time window may be specified in various ways such as "the first 'X' minutes of the classroom session".

NumHintsUsedFromBeg: This gives the number of hints used by the student in a classroom within a particular time window. The time window may be specified in various ways such as "the first 'X' minutes of the classroom session".

TimeFromBeg: This feature indicates the amount of time spent during the classroom session so far.

QuestionNoFromBeg: Total number of questions within a particular time window. The time window may be specified in various ways such as "the first 'X' minutes of the classroom session".

NumTrialsUntilSuccess: Total number of trials used on a successful attempt on a particular question. The question may be specified based on the educational content (e.g., algebra, geometry etc. or a particular instance during the classroom session (e.g., the beginning, middle or the end of the classroom session, etc.

CorrectAttemptsPercent: Ratio of successful attempts and the number of hints used to the total number of attempts on a set of questions on a topic.

FailedAttemptsPercent: Ratio of failed attempts and the number of hints used to the total number of attempts on a set of questions on a topic.

NumLastXQuestionsHintsUsed: Number of questions in the last 'X' attempted where hints have been used. 'X' may be any positive integer.

TotalTimeSpentOnQuestions: Total time spent on solving questions exclusively.

TimeSpentOverCorrectsPercent: Ratio of TotalTimeSpentOnQuestions/CorrectAttemptsPercent.

NumXAttemptsFailed: Number of failed attempts in the most recent 'X' attempts where 'X' is any positive integer.

NumXFailedAttemptsInRow: Number of 'X' successive failed attempts in a row where 'X' is any positive integer.

TimeSpentOnFirstAttempts: Number of seconds spent on the first attempts on the questions under a particular topic. The topic may be specified based on the content or a particular instance during the classroom session (e.g. the beginning, middle or the end of the classroom session).

AttemptFailedAfterHint: This is a binary value which indicates whether a particular attempt on a question where a hint was used failed. The attempt may be specified according to a temporal criterion (e.g. 10 minutes after the classroom session starts) or its relative rank in all attempts (e.g. the first, second or third attempt on a question)

TimeSpentOnQuestion: Total time spent on hints and attempts on a particular question in the classroom session. The question may be specified based on the educational content (e.g., algebra, geometry, etc.) or a particular instance during the classroom session (e.g. the beginning, middle or the end of the classroom session, etc.).

NumHintsUsedOnAttempt: Total number of hints requested during a particular attempt of the classroom session. The attempt may be specified according to a temporal criterion (e.g., 10 minutes after the classroom session starts) or its relative rank in all attempts (e.g., the first, second or third attempt on a question).

NumHintsUsedOnQuestion: Total number of hints requested on a particular question during the classroom session. The question may be specified based on the educational content (e.g., algebra, geometry, etc.) or a particular instance during the classroom session (e.g., the beginning, middle or the end of the classroom session etc.)

AttemptDuration: Number of seconds spent on a particular topic that was covered during the classroom session. The topic may be specified based on the content or a particular instance during the classroom session (e.g., the beginning, middle or the end of the classroom session).

VideoDuration: Time spent on a particular instructional video during the classroom session. The instructional video may be specified based on its content (e.g., algebra, geometry, etc.), total duration (e.g., instructional videos longer than 120 seconds etc.) or a particular instance during the classroom session (e.g. the beginning, middle or the end of the classroom session).

WindowNoWithinSegment: Index of an ongoing instructional video log record or a question under a current topic. With each incoming log instance, this index is incremented by one. When there is a switch between an instructional session to an assessment (or vice versa) the index is reset to zero. Similarly, if the student moves to a new topic from the current one, reset to zero is applied.

Question: Total number of questions visited during the classroom session so far.

Trial: Total number of question attempts during the classroom session so far.

Gender: Student gender is used as a feature without any processing.

The features are used by the corresponding CPM classifier to determine an emotional state and a behavioral state. In addition to the CPM component that uses log data, the APM classifier may also be used to determine an emotional state and a behavioral state from video data.

Figure 6:
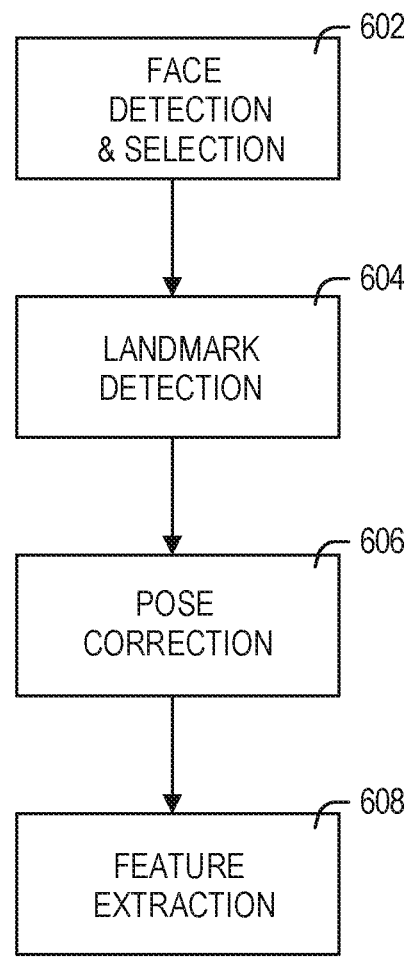
FIG. 6 illustrates a flowchart showing an example of a process flow for facial feature extraction according to some embodiments.

FIG. 6 illustrates a flowchart showing an example of a process flow for facial feature extraction according to some embodiments. The facial feature extraction may be done by a face detector that determines if a face is present in data. Data from a camera may be used to determine if a face is present. If a face is present, facial feature data may be extracted and used by the APM to determine the emotional and behavioral states.

Figure 7:
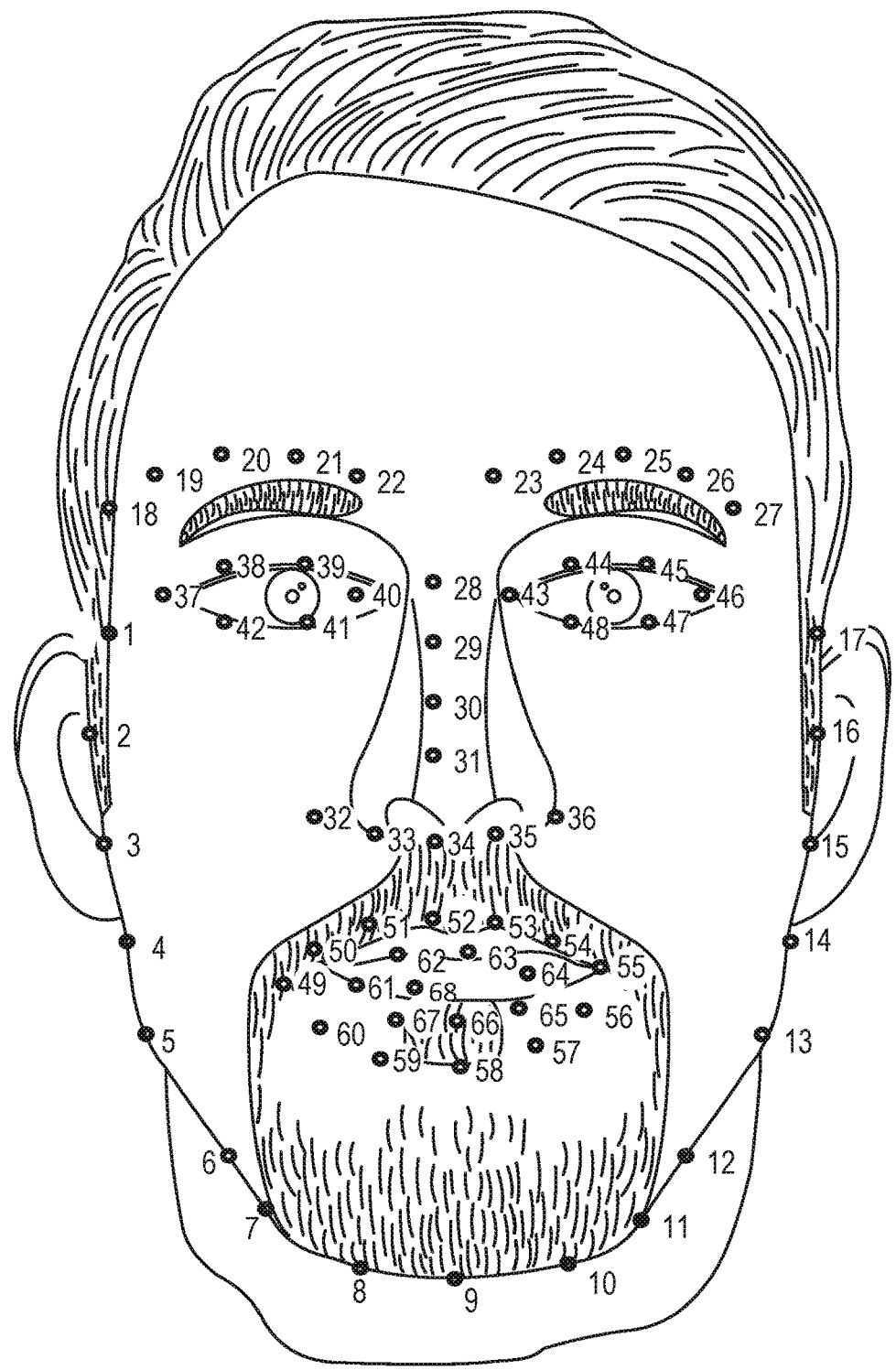
FIG. 7 illustrates facial landmarks used in appearance mapping according to some embodiments.

At 602, frames from video data are analyzed to determine if a face is detected. In an example, a histogram of gradients features and a support vector machine detector may be used to detect faces in the frames. If there are multiple faces detected, the closest or the largest face is selected as the face. At 604, the selected face is used to detect landmarks. The human face may be represented using a set of points referred to as the landmarks. In an example, a model that uses 68 landmarks to represent the face was used. FIG. 7 illustrates facial landmarks used in appearance mapping according to some embodiments.

Figure 8A:
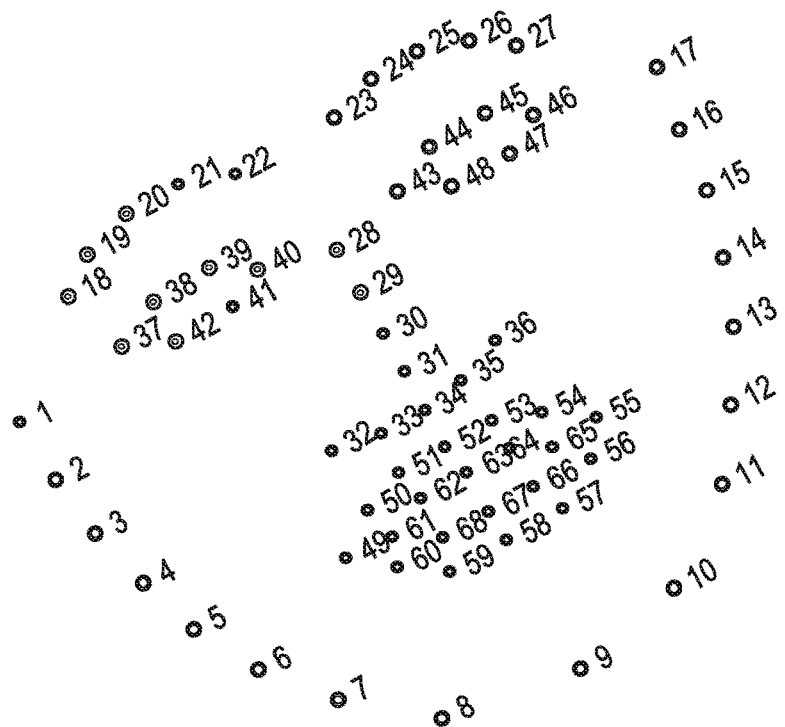
Figure 8B:
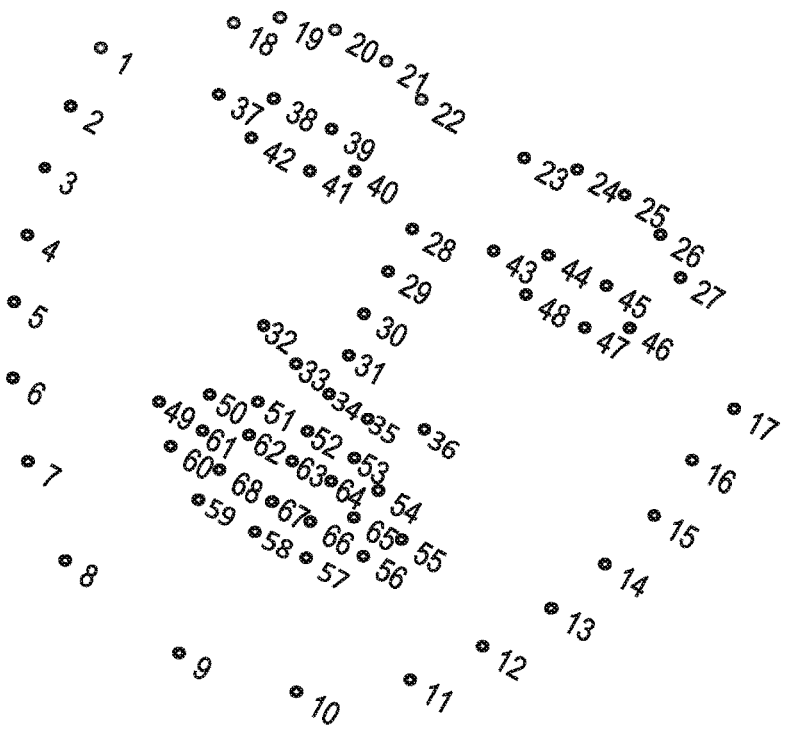
Figures 8C, 9:
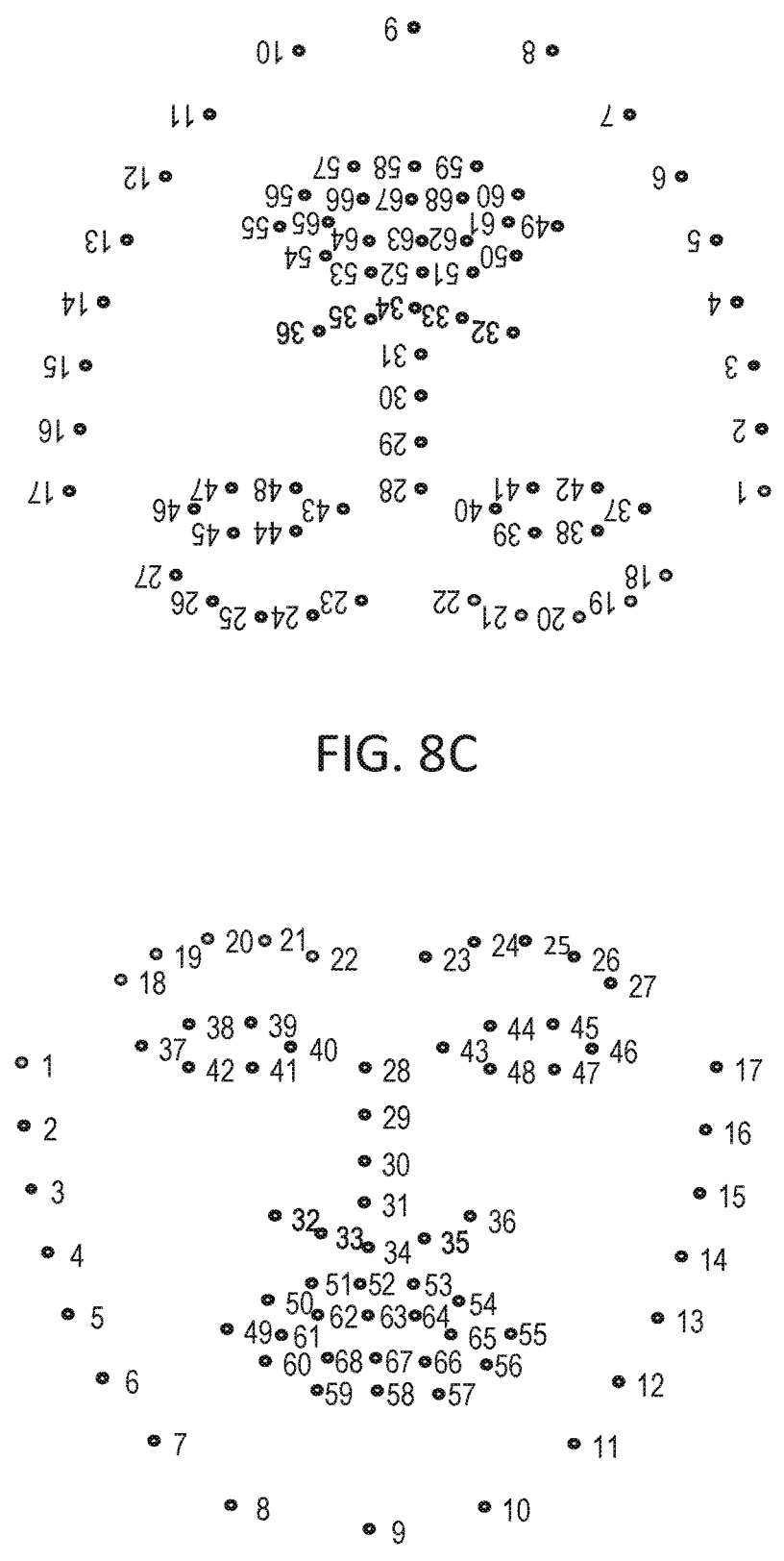

At 606, the landmarks are used for pose correction. For example, FIGS. 8A-8C show various sample orientations of extracted facial features. FIG. 9 shows the corrected facial landmark representation. As shown in FIGS. 8A-8C, the human face in a 2D scene may be offset in various ways. To correct the landmarks, the head pose is estimated. In an example, head pose is estimated by aligning the extracted landmarks to a prototypical 3D face shape. The aligned extracted landmarks may be transferred into the three-dimensional space. The aligned landmarks may then by transformed to have an upright and frontal position.

At 608, features may be extracted from the corrected facial landmark representation. In an example, 68 facial landmarks shown in FIG. 7 may be used to perform the facial expression extraction. In an example, the facial expressions are based on parameters called "Face Animation Parameters" (FAPs) published as part of the Moving Pictures Expert Group, MPEG-4 International standard, ISO/IEC 14496. The standard defines a total of 68 FAPs. In an example, a subset of 41 features are extracted and used to generate features for the APM component. The value calculation of these FAPs may be performed as described in the existing standard, however we have re-defined the maximum and the minimum limits within which they may vary based on variable number of bit length 'N', Where 'N' is any positive integer. TABLE 3 lists the 41 FAPs that may be used in various examples.

TABLE 3

| FAP Name | FAP Description | Value Range |
|---|---|---|
| open_jaw | Vertical jaw displacement | $[-(2^{N-1}), 2^{N-1}-1]$ |
| lower_t_midlip | Vertical top middle inner lip displacement | $[-(2^{N-1}), 2^{N-1}-1]$ |
| raise_b_midlip | Vertical bottom middle inner lip displacement | $[-(2^{N-1}), 2^{N-1}-1]$ |
| stretch_l_cornerlip | Horizontal displacement of left inner lip corner | $[-(2^{N-1}), 2^{N-1}-1]$ |
| stretch_r_cornerlip | Horizontal displacement of right inner lip corner | $[-(2^{N-1}), 2^{N-1}-1]$ |
| lower_lip_lm | Vertical displacement of midpoint between left corner and middle of top inner lip | $[-(2^{N-1}), 2^{N-1}-1]$ |
| lower_lip_rm | Vertical displacement of midpoint between right corner and middle of top inner lip | $[-(2^{N-1}), 2^{N-1}-1]$ |
| raise_b_lip_lm | Vertical displacement of midpoint between left corner and middle of bottom inner lip | $[-(2^{N-1}), 2^{N-1}-1]$ |
| raise_b_lip_rm | Vertical displacement of midpoint between right corner and middle of bottom inner lip | $[-(2^{N-1}), 2^{N-1}-1]$ |
| raise_l_cornerlip | Vertical displacement of left inner lip corner | $[-(2^{N-1}), 2^{N-1}-1]$ |
| raise_r_cornerlip | Vertical displacement of right inner lip corner | $[-(2^{N-1}), 2^{N-1}-1]$ |
| thrust_jaw | Depth displacement of jaw | $[-(2^{N-1}), 2^{N-1}-1]$ |
| shift_jaw | Side to side displacement of jaw | $[-(2^{N-1}), 2^{N-1}-1]$ |
| push_b_lip | Depth displacement of bottom middle lip | $[-(2^{N-1}), 2^{N-1}-1]$ |
| push_lip | Depth displacement of top middle lip | $[-(2^{N-1}), 2^{N-1}-1]$ |
| close_t_l_eyelid | Vertical displacement of top left eyelid | $[-(2^{N-1}), 2^{N-1}-1]$ |
| close_t_r_eyelid | Vertical displacement of top eyelid right eyelid | $[-(2^{N-1}), 2^{N-1}-1]$ |
| close_b_l_eyelid | Vertical displacement of bottom left eyelid | $[-(2^{N-1}), 2^{N-1}-1]$ |
| close_b_r_eyelid | Vertical displacement of bottom right eyelid | $[-(2^{N-1}), 2^{N-1}-1]$ |
| raise_l_i_eyebrow | Vertical displacement of left inner eyebrow | $[-(2^{N-1}), 2^{N-1}-1]$ |
| raise_r_i_eyebrow | Vertical displacement of right inner eyebrow | $[-(2^{N-1}), 2^{N-1}-1]$ |
| raise_m_eyebrow | Vertical displacement of left middle eyebrow | $[-(2^{N-1}), 2^{N-1}-1]$ |
| raise_r_m_eyebrow | Vertical displacement of right middle eyebrow | $[-(2^{N-1}), 2^{N-1}-1]$ |
| raise_l_o_eyebrow | Vertical displacement of left outer eyebrow | $[-(2^{N-1}), 2^{N-1}-1]$ |
| raise_r_o_eyebrow | Vertical displacement of right outer eyebrow | $[-(2^{N-1}), 2^{N-1}-1]$ |
| squeeze_l_eyebrow | Horizontal displacement of left eyebrow | $[-(2^{N-1}), 2^{N-1}-1]$ |
| squeeze_r_eyebrow | Horizontal displacement of right eyebrow | $[-(2^{N-1}), 2^{N-1}-1]$ |
| lower_t_midlip_o | Vertical top middle outer lip displacement | $[-(2^{N-1}), 2^{N-1}-1]$ |
| raise_b_midlip_o | Vertical bottom middle outer lip displacement | $[-(2^{N-1}), 2^{N-1}-1]$ |
| stretch_l_cornerlip_o | Horizontal displacement of left outer lip corner | $[-(2^{N-1}), 2^{N-1}-1]$ |
| stretch_r_cornerlip_a | Horizontal displacement of right outer lip corner | $[-(2^{N-1}), 2^{N-1}-1]$ |
| lower_t_lip_lm_o | Vertical displacement of midpoint between left corner and middle of top outer lip | $[-(2^{N-1}), 2^{N-1}-1]$ |
| lower_t_lip_rm_o | Vertical displacement of midpoint between right corner and middle of top outer lip | $[-(2^{N-1}), 2^{N-1}-1]$ |
| raise_b_lip_lm_o | Vertical displacement of midpoint between left corner and middle of bottom outer lip | $[-(2^{N-1}), 2^{N-1}-1]$ |
| raise_b_lip_rm_o | Vertical displacement of midpoint between right corner and middle of bottom outer lip | $[-(2^{N-1}), 2^{N-1}-1]$ |
| raise_l_cornerlip_o | Vertical displacement of left outer lip corner | $[-(2^{N-1}), 2^{N-1}-1]$ |
| raise_r_cornerlip_o | Vertical displacement of right outer lip corner | $[-(2^{N-1}), 2^{N-1}-1]$ |
| stretch_l_nose | Horizontal displacement of left side of nose | $[-(2^{N-1}), 2^{N-1}-1]$ |
| stretch_r_nose | Horizontal displacement of right side of nose | $[-(2^{N-1}), 2^{N-1}-1]$ |
| raise_nose | Vertical displacement of nose tip | $[-(2^{N-1}), 2^{N-1}-1]$ |
| bend_nose | Horizontal displacement of nose tip | $[-(2^{N-1}), 2^{N-1}-1]$ |

Once the FAPs are extracted for each frame, then statistical features over these FAPs may be calculated for each instance (e.g., a window of 8-seconds). A set of statistical features to be considered for each FAP. In an example, the features may be based on the following definitions:

Mean of FAP X over a time window of Y seconds, where 'X' may be any of the FAPs listed in TABLE 3 and 'Y' is a positive floating point number.

Standard deviation of FAP X over a time window of Y seconds, where 'X' may be any of the FAPs listed in TABLE 3 and 'Y' is a positive floating point number.

Maximum value of FAP X over a time window of Y seconds, where 'X' may be any of the FAPs listed in TABLE 3 and 'Y' is a positive floating point number.

Minimum value of FAP X over a time window of Y seconds, where 'X' may be any of the FAPs listed in TABLE 3 and 'Y' is a positive floating point number.

Maximum difference between successive values of FAP X over a time window of Y seconds, where 'X' may be any of the FAPs listed in TABLE 3 and 'Y' is a positive floating point number.

Minimum difference between successive values of FAP X over a time window of Y seconds, where 'X' may be any of the FAPs listed in TABLE 3 and 'Y' is a positive floating point number.

Accumulated (i.e. integrated) values of FAP X over a time window of Y seconds, where 'X' may be any of the FAPs listed in TABLE 3 and is a positive floating point number.

Number of FAP X samples over a time window of Y seconds that are above value Q, where 'X' may be any of the FAPs listed in TABLE 3, 'Y' is a positive floating point number and 'Q' is a predefined threshold.

Number of FAP X samples over a time window of Y seconds that are below value Q, where 'X' may be any of the FAPs listed in TABLE 3, 'Y' is a positive floating point number and 'Q' is a predefined threshold.

Average of samples that satisfy the number of FAP X samples over a time window of Y seconds that are above value Q.

Average of samples that satisfy criteria in the number of FAP X samples over a time window of Y seconds that are below value Q.

Standard deviation of samples that satisfy criteria in the number of FAP X samples over a time window of Y seconds that are above value Q.

Standard deviation of samples that satisfy criteria in the number of FAP X samples over a time window of Y seconds that are below value Q.

In addition to the FAN and the set of statistical features given above for these FAPs, the following metrics may also be calculated and used as features for classification.

face_std_position: Standard deviation of the face movement based on motion over time between successive video frames.

face_meanabs_vel: Mean speed of the face over time.

face_meanabs_acc: Mean absolute acceleration of the face over time.

face_mes: Kinetic energy of the face based on relative motion along x, y and z axes.

pose_mean_position: Mean position of the head based on yaw, pitch and rotation movements over time.

pose_std_position: Standard deviation of the head based on yaw, pitch and rotation movements over time.

pose_meanabs_vel: Mean speed of the head based on yaw, pitch and rotation movements over time.

pose_meanabs_acc: Mean absolute acceleration of the head pose based on yaw, pitch and rotation movements over time.

pose_mes: Kinetic energy of the head pose based on relative yaw, pitch and rotation.

In addition to the above, the following combined face and head pose features may also be calculated and used as features that are input to the APM component.

MotionSegNum: Total number of head center and head pose availability per second.

MotionSegRatio: Sum of "head center occurrence per millisecond" and "head pose occurrence per millisecond".

MotionSegTotEng: Sum of "average number of head center occurrence" and "average number of head pose occurrence".

In summary, the features extracted include ones that are computed over FAPs and the ones that are computed from all landmarks to define the position and movement of the face and head as a whole. These features may then be input into the APM classifier for inference.

As described above, the CPM and the APM components may be used to generate a behavioral and emotional engagement state. The LEI component may be used to fuse these states together into a final engagement state. The final engagement state may be used to update a dashboard that communicates the engagement state for each student.

Figure 4:
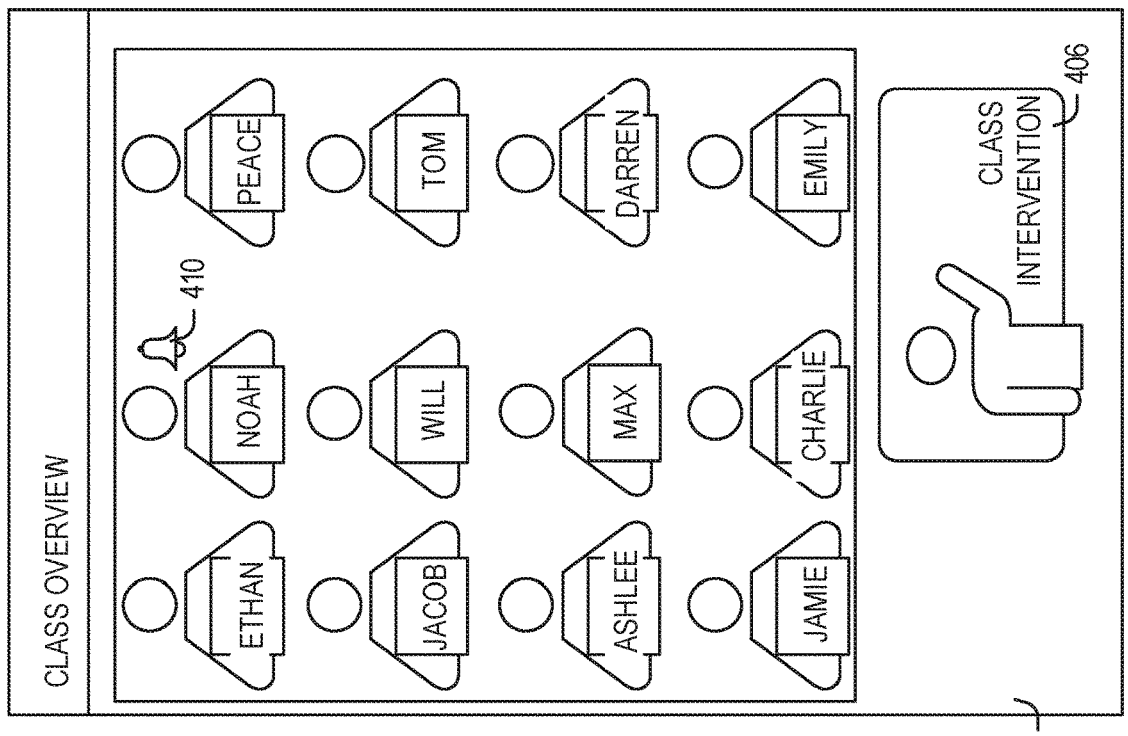
FIG. 4 illustrates a dashboard and color mapping for engagement states according to some embodiments.
Figure 4:
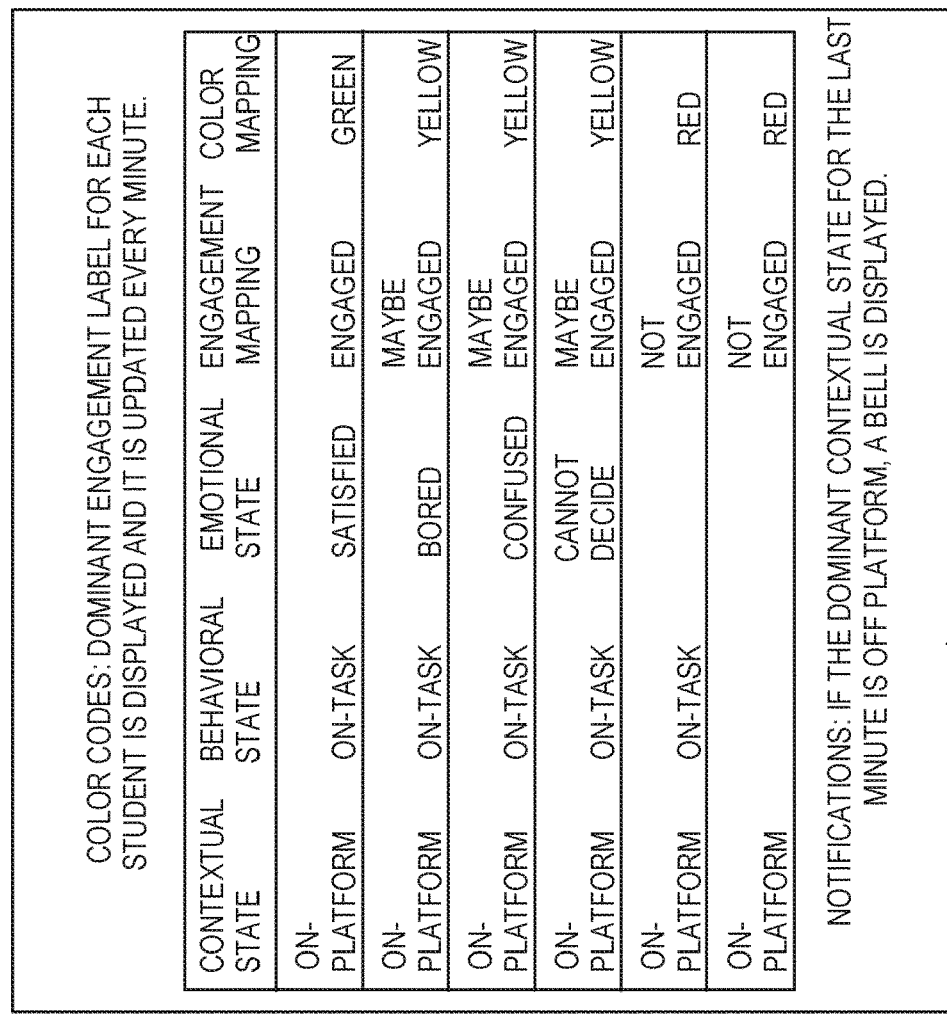

FIG. 4 illustrates a dashboard and color mapping for engagement states according to some embodiments. Screen 402 displays overall class-level analytics. In an example, as providing the engagement states every 4 seconds would result in an impractically high cognitive load for the teacher, these analytics may be calculated and updated over one-minute intervals. In other examples, different intervals may be used, such as, but not limited to, 30 seconds, 45 seconds, 90 seconds, etc.

Figure 5:
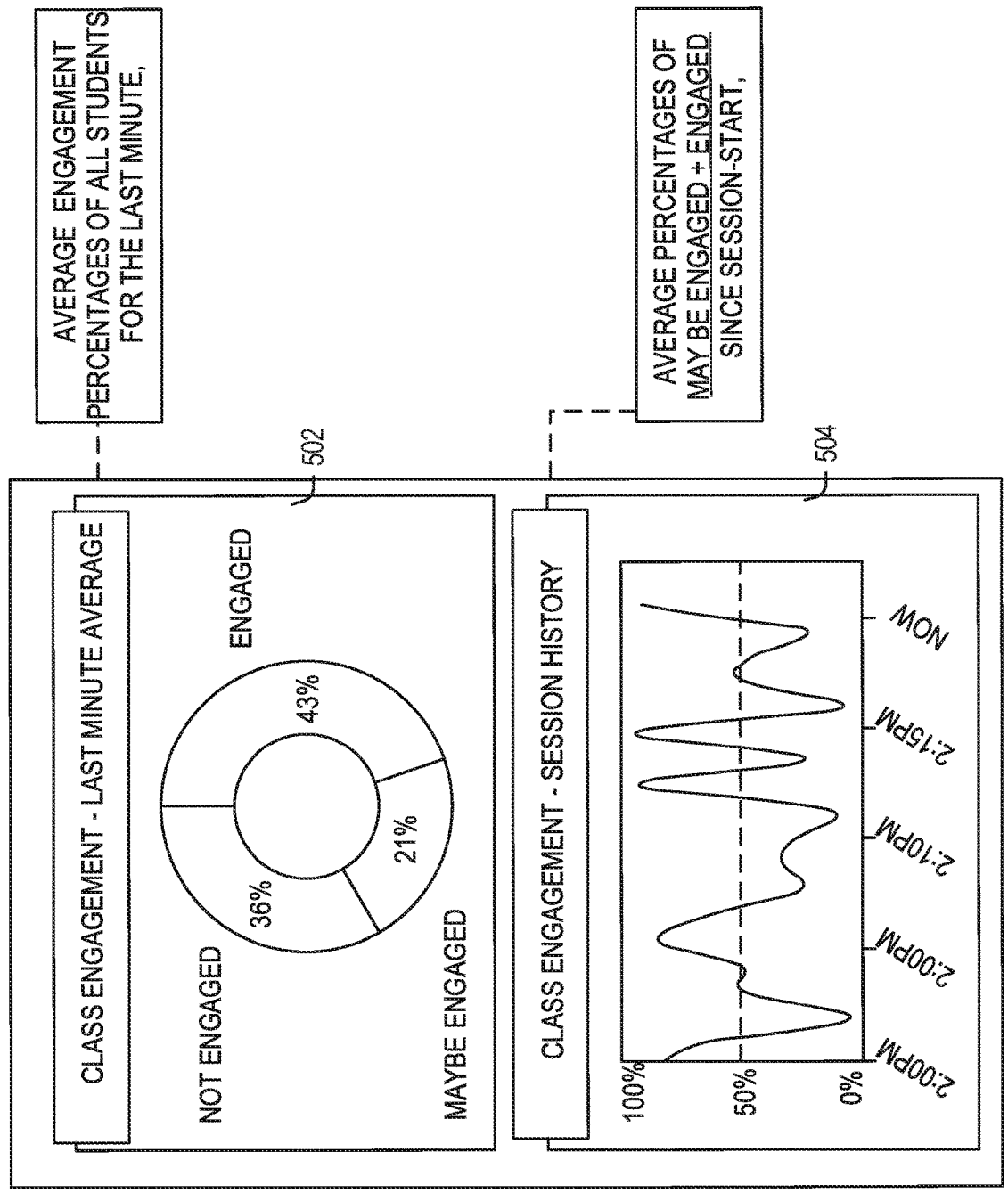
FIG. 5 illustrates additional dashboard components according to some embodiments.

Screen 402 allows a teacher to view all students in the classroom and have an overall understanding of the engagement state. Therefore, the default view of the dashboard displays the engagement level of all students, together with visuals to summarize the overall status. An example visualization for such a system is given in FIG. 4. The screen 402 includes a student-level status screen and may also include other elements, such as those from FIG. 5. FIG. 5 illustrates additional dashboard components according to some embodiments.

Displayed on screen 402, students are represented by their avatars/pictures, and their engagement levels are color coded. The states of Engaged, Maybe_Engaged, and Not_Engaged as represented by green, yellow, and red colors, respectively. Gray is used to represent segments where no data is available. Table 404 provides a mapping of behavioral and emotional states to a color. Screen 402 informs a teacher when a student is Off-Platform (e.g., student does not have the content platform open/visible). In such a case, a bell 410 near the avatar may be displayed as a notification. For engagement states and for the Off-Platform contextual state, the instances for the last minute are analyzed to assign the dominant engagement state (Engaged (E), Maybe_Engaged (MBE), or Not_Engaged (NE)) and the contextual state (Off-Platform or On-Platform). These assigned states may be utilized to update the avatar of each student every minute; the color is set according to the dominant engagement state and the bell notification is displayed if the dominant contextual state is Off-Platform. Checking the color codes together with the bell notifications, a teacher may identify whom to intervene. The pseudo code for the calculations are provided in TABLE 4 and TABLE 5, for determining color codes and determining when to provide a notification.

TABLE 4

Color Codes:

Definition: For the last 1 minutes, find the dominant_engagement label for each student; update every minute.
Begin after 1 minutes since session start has passed.
Iterate every minute for each student:
   (1) Using instance-wise start & end times, find the instances that fall in the previous 1 minute. (instCount)
   (2) Find the number of instances that are N/A (naCount)
   (3) If naCount/instCount >=0.5
      engagement is N/A (Color: Gray/Black?)
    else
      find the number of valid instances (ct_ALL = instCount − naCount)
      find number of instances for each engagement (ct_E, ct_NE, ct_MBE)
      calculate the ratios for each engagement (r_E=ct_E/ct_ALL, r_NE=ct_NE/ct_ALL, r_MBE=ct_MBE/ct_ALL)
      find the max of r_E, r_NE, r_MBE (r_max)
      if there is a tie (at least two of the values equal r_max):
      engagement is the last 1 minute window's engagement value (if this is the first window, assign NA)
         elseif max is r_E:
         engagement is Engaged (Color: Green)
         elseif max is r_NE:
         engagement is Not Engaged (Color: Red)
         elseif max is r_MBE:
         engagement is May Be Engaged (Color: Yellow)

TABLE 5

Notifications:

Definition: For the last 1 minute, if the student is Off Platform, display a bell (without counter, counter is not needed).
  Iterate every minute for the each student:
   (1) Using instance-wise start & end times, find the instances that fall in the previous 1 minute. (instCount)
   (2) Find the number of instances that are Off Platform (offPlatformCount)
   (3) If offPlatformCount/instCount >=0.5
     student is "Off Platform"

Panel 502 displays the percentages for the engagement states are displayed as summarized over all students for the last minute. This display may help the teacher identify any event that would result in a momentary engagement change for the whole class. The pseudo code for calculating engagement state percentages are given in TABLE 6.

TABLE 6

Average Engagement Percentages:

Definition: For the last 1 minute, find the ratio of the instances with different engagement labels; update every minute.
Begin after 1 minute since session start has passed.
Iterate every minute:
   (1) Find engagement ratios (r_E, r_NE, r_MBE) for the previous 1 minute for each student.
   (2) Find the average engagement ratios (avg_r_E, avg_r_NE, avg_r_MBE).
   (3) Normalize engagement ratios so that avg_r_E + avg_r_NE + avg_r_MBE = 1.
   (4) Pot percentages.

Panel 504 displays the engagement of the whole class is plotted versus time, where engagement is considered to include either being Engaged or Maybe_Engaged. This plot may help the teacher monitor the status over the whole session and identify events occurring throughout the session duration. The pseudo code is given in TABLE 7.

TABLE 7

Average Engagement History:

Definition: For the elapsed portion of the session, plot percentage of May be Engaged + Engaged ratios, updating every minute.
Begin after 1 minute since session start has passed.
Every minute:
   (1) Find average May be Engaged + Engaged percentages (as given above, avg_r_E and avg_r_MBE) for the last 1 minute.
   (2) Update plot.

In the class-view screen 402, there may be a user interface element 406 called "Class Intervention". The user interface element may be a soft button or user interface control, in an example. In a pilot study, teachers used this button whenever the teacher gave an intervention. The functionality of this button 406 may log the time of the intervention. This logging may be used to tag important class-centric events that may be used when investigating class status after a session has ended. In addition, the button 406 may be used to broadcast a message to all the students, or to freeze student screens when making an announcement.

In addition to the class overview, a student specific overview may be used to provide student-level analytics. This screen may be activated by the teacher by clicking on the student's avatar to be monitored. This screen may include student-level session mood and student-level engagement history.

The student-level session moods may be ranked according to the percentage of their occurrence for the whole session up till the button click. An emotional state is stated to be "Mostly", if it is the dominant emotion (i.e., if the percentage is more than 50%); or to be "Sometimes", if it is not a dominant emotion (i.e., if the percentage is below 50%). Although the percentages for emotional states are calculated, these numbers may not be shown to the teacher. Not displaying these numbers may avoid increasing the cognitive load. In an example, these numbers may be displayed by showing the respective number in a text box when the cursor hovers over an emotional state in this pane. These analytics may help a teacher understand the overall emotional status of each student in that specific session to enable the teacher to identify any emotionally challenged individual. The pseudo code on how the session mood is calculated is given in TABLE 8.

TABLE 8

Emotions for the session until now:

Definition: For the time lapse in session, find ratio of the instances with different emotion labels for that specific student.
For the specific student:
   (1) Find the total number of instances in that session until now. (instCount)
   (2) Find the number of instances that are N/A (naCount)
   (3) Find the number of valid instances (ct_ALL = instCount − naCount)
   (4) If ct_ALL>0
     find number of instances for each emotion (ct_S, ct_B, ct_C)
     calculate ratios for each emotion
     (r_S=ct_S/ct_ALL, r_B=ct_B/ct_ALL, r_C=ct_C/ct_ALL)
     sort ratios in descending order
     if there is a ratio that is >=0.5
       print that emotion with "Mostly"
       for other emotions print "Sometime" (in the descending ratio order)

The engagement history for a specific student may be plotted versus time. Here, engagement is considered to include either being Engaged or Maybe_Engaged. This plot may help a teacher monitor the status of a specific student and identify events affecting the learning experience of the student. The pseudo code on the generation of the student-level engagement history plot is given in TABLE 9. Any student-level analytics screen may include a "Student Intervention" button similar to the "Class Intervention" button in the class-level analytics screen.

TABLE 9

Engagement History:

Definition: For the elapsed portion of the session, plot percentage of May be Engaged + Engaged ratios for the specific student, updating every minute.
Every minute:
 (1) Find May be Engaged + Engaged percentages for the last 1. minute for the specific student (as in Class-level Average Engagement Percentages, step (1)).
 (2) Update plot.

Figure 10:
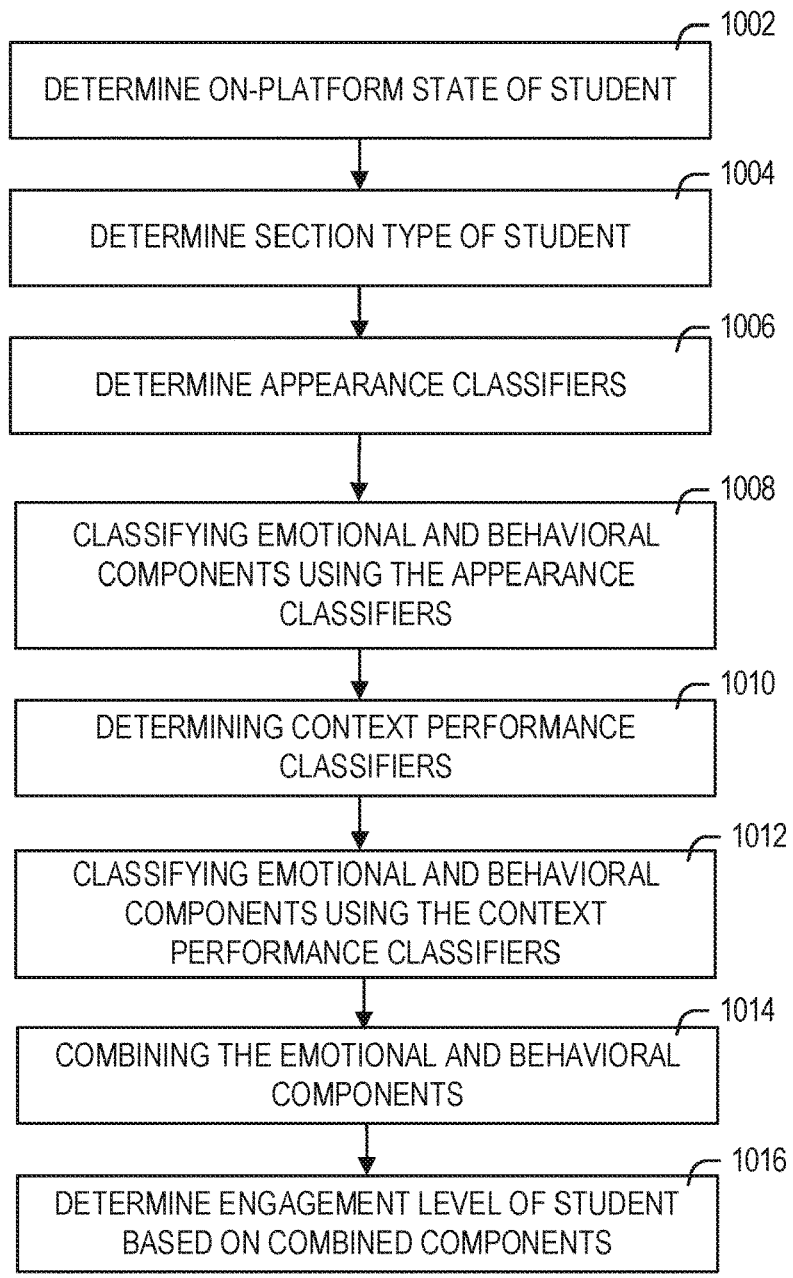
FIG. 10 illustrates a flowchart for engagement dissemination according to some embodiments.

FIG. 10 illustrates a flowchart for engagement dissemination. At 1002, log data is used to determine if a student if on-platform or off-platform. In an example, a student may be considered on-platform based on web access log data. For example, a user accessing educational web content for the student's current class may be considered on-platform. At 1004, a section type for the student is determined based on the log data. In an example, the section type may be instructional or assessment. An instructional section type indicates the student is accessing instructional material, such as videos or text. An assessment section type indicates the student is answering questions about educational content.

At 1006, appearance classifiers are selected based on the section type. A face may be detected from video and used by the appearance classifiers. Based on the detected face, features of the detected face may be determined. In an example, an appearance monitor (APM) selects an emotional classifier and a behavioral classifier based on the section type. At 1008, emotional and behavioral components are classified using the selected classifiers and the features of the detected face. In an example, features from the detected face are determined based on a proper subset of face animation parameters. In addition, features from the detected face may be calculated based on movement of the detected face from previous video data. These features may be used by the appearance classifiers.

At 1010, context performance classifiers are selected based on the section type. In an example, a context-performance component (CPM) selects an emotional classifier and a behavioral classifier based on the section type. At 1012, emotional and behavioral components are classified using the selected classifiers and the log data. In an example, features such as a number of questions accessed in a previous context time period and a number of questions where a hint associated with a question was accessed in the previous context time period are determined. These features may be used by the context performance classifiers.

At 1014, the emotional components and the behavioral components from the APM and CPM are combined into an emotional state and a behavioral state, respectively. In an example, the APM and CPM provide a confidence score with the components. The component with the highest confidence score may be used as the selected state. At 1016, based on the emotional state and the behavioral state, an engagement level of the student is determined. In an example, the behavioral state may be determined based on TABLE 1 above. In an example, the engagement level may be one of engaged, may be engaged, or not engaged. In an example, the behavior state may be on-task or off-task. In an example, the emotional state may be satisfied, bored, or confused.

The engagement level of students may be used in a dashboard of a classroom. In an example, each student is represented by an avatar. The avatar may have a color based on the engagement level of the student. In an example, an engagement color is determined based on the engagement level of the student. The student avatar may be the engagement color and may be displayed as part of the dashboard, such as the exemplary dashboard in FIG. 4. The engagement color may be determined by determining a number of engagement levels for a previous time period, e.g., 1 minute. A ratio may be calculated using the number of engagement levels and the number of engagement level for each possible engagement level. The largest ratio may then be used to select the engagement color for the student.

In addition, the engagement level may be used to determine to display an intervention alert for the student based on the engagement level of the student. In an example, the intervention alert may be displayed after the student has been not engaged for more than a predetermined amount of time, such as 5 minutes, 10 minutes, 25% of the class period, etc.

Example Machine Description

Figure 11:
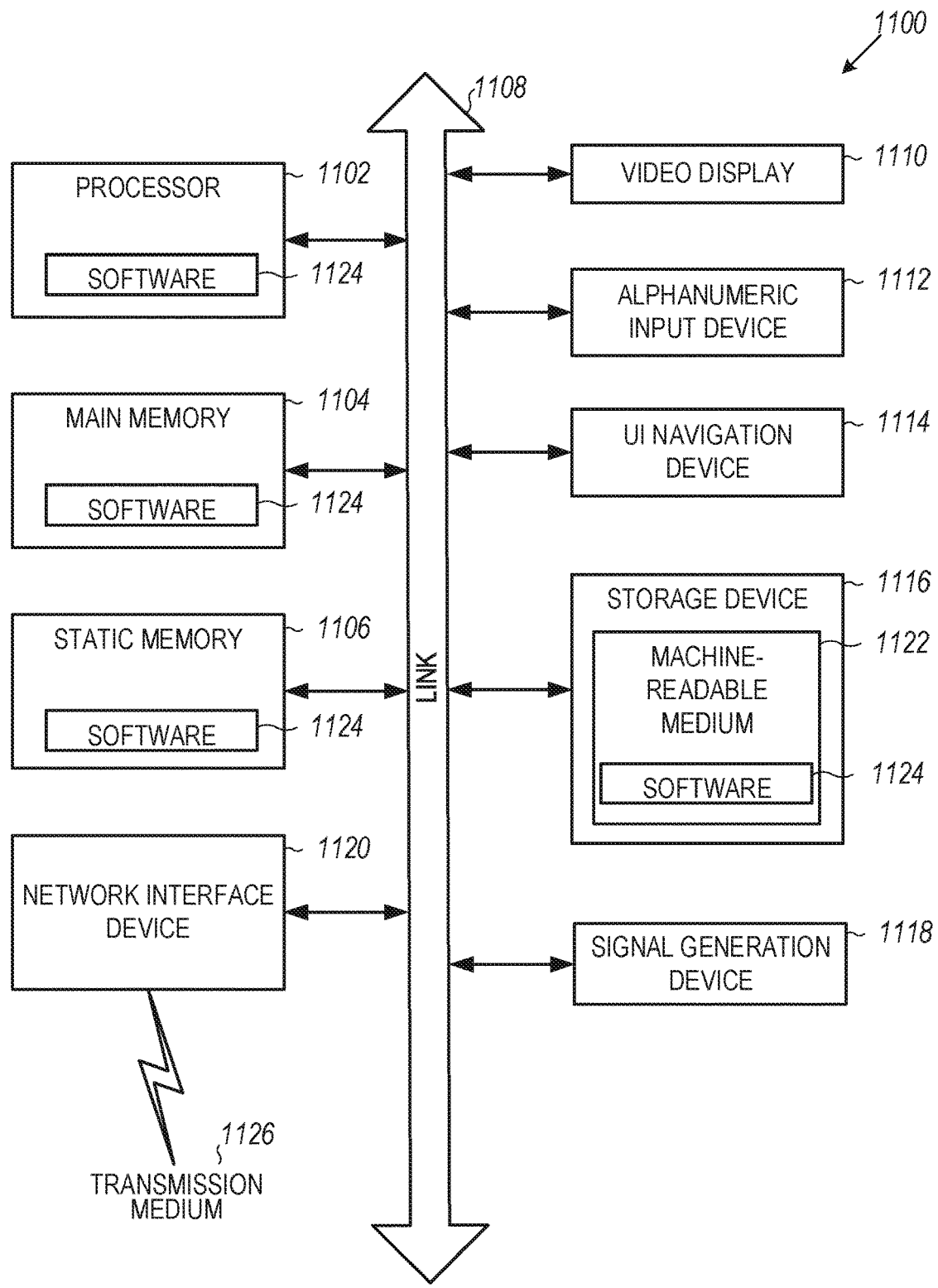
FIG. 11 illustrates a block diagram of a computing device, within which a set or sequence of instructions may be executed to cause the device to perform examples of any one of the methodologies discussed herein.

FIG. 11 illustrates a block diagram of computing device 1100, within which a set or sequence of instructions may be executed to cause the device to perform examples of any one of the methodologies discussed herein. In alternative embodiments, the machine 1100 may operate as a stand-alone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, components, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a module that operates to perform specified operations, In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus for engagement dissemination, the apparatus comprising: a face detector configured to detect a face in video data; a context filterer configured to determine a student is on-platform based on log data and to determine a section type for the student based on the log data; an appearance monitor configured to: select a first emotional classifier specific to the section type; classify, using the first emotional classifier, a first emotional component based on the detected face; select a first behavioral classifier specific to the section type; and classify, using the first behavioral classifier, a first behavioral component based on the detected face; a context-performance monitor configured to: select a second emotional classifier specific to the section type; classify, using the second emotional classifier, a second emotional component based on the log data and the section type; select a second behavioral classifier specific to the section type; and classify, using the second behavioral classifier, a second behavioral component based on the log data and the section type; a fuser configured to: combine the classified first emotional component and the second emotional component into an emotional state of the student based on confidence values of the first emotional component and the second emotional component; combine the classified first behavioral component and the second behavioral component into a behavioral state of the student based on confidence values of the first behavioral component and the second behavioral component; and determine an engagement level of the student based on the emotional state of the student and the behavioral state of the student.

In Example 2, the subject matter of Example 1 includes, wherein the engagement level is one of engaged, may be engaged, or not engaged.

In Example 3, the subject matter of Example 2 includes, a dashboard configured to: determine an engagement color based on the engagement level of the student; and display a student avatar, wherein the student avatar is colored the engagement color.

In Example 4, the subject matter of Example 3 includes, wherein the dashboard is further configured to display an intervention alert for the student based on the engagement level of the student.

In Example 5, the subject matter of Examples 3-4 includes, wherein to determine the engagement color, the dashboard is further configured to: determine a number of engagement levels for a previous time period; determine a number of engagement level for each possible engagement level of the student for a previous time period; calculate a ratio using the number of engagement levels and the number of engagement level for each possible engagement level; determine a largest ratio from the calculated ratios; and determine the engagement color based on the largest ratio.

In Example 6, the subject matter of Examples 1-5 includes, wherein the behavior state is one of on-task or off-task.

In Example 7, the subject matter of Examples 4-6 includes, wherein the emotional state is one of satisfied, bored, or confused.

In Example 8, the subject matter of Examples 1-7 includes, wherein the appearance monitor is further configured to: calculate first features from the detected face based on a proper subset of face animation parameters; and calculate second features from the detected face based on movement of the detected face from previous video data, wherein the first features and the second features are used by the first emotional classifier and the second behavioral classifier.

In Example 9, the subject matter of Examples 1-8 includes, wherein the context-performance monitor is further configured to: determine a number of questions accessed in a previous context time period; and determine a number of questions where a hint associated with a question was accessed in the previous context time period, wherein the number of questions and the number of questions where a hint associated with a question was accessed are used by the first behavioral classifier and the second behavioral classifier.

Example 10 is a method for engagement dissemination, the method comprising operations performed using an electronic processor, the operations comprising: detecting a face in video data; determining a student is on-platform based on log data; determining a section type for the student based on the log data; selecting, using an appearance monitor (APM), a first emotional classifier specific to the section type; classifying, using the first emotional classifier, a first emotional component based on the detected face; selecting, using the APM, a first behavioral classifier specific to the section type; and classifying, using the first behavioral classifier, a first behavioral component based on the detected face; selecting, using a context-performance monitor (CPM), a second emotional classifier specific to the section type; classifying, using the second emotional classifier, a second emotional component based on the log data and the section type; selecting, using the CPM, a second behavioral classifier specific to the section type; and classifying, using the second behavioral classifier, a second behavioral component based on the log data and the section type; combining the classified first emotional component and the second emotional component into an emotional state of the student based on confidence values of the first emotional component and the second emotional component; combining the classified first behavioral component and the second behavioral component into a behavioral state of the student based on confidence values of the first behavioral component and the second behavioral component; and determining an engagement level of the student based on the emotional state of the student and the behavioral state of the student.

In Example 11, the subject matter of Example 10 includes, wherein the engagement level is one of engaged, may be engaged, or not engaged.

In Example 12, the subject matter of Example 11 includes, determining an engagement color based on the engagement level of the student; and displaying a student avatar, wherein the student avatar is colored the engagement color.

In Example 13, the subject matter of Example 12 includes, displaying an intervention alert for the student based on the engagement level of the student.

In Example 14, the subject matter of Examples 12-13 includes, wherein determining the engagement color comprises: determining a number of engagement levels for a previous time period; determining a number of engagement level for each possible engagement level of the student for a previous time period; calculating a ratio using the number of engagement levels and the number of engagement level for each possible engagement level; determining a largest ratio from the calculated ratios; and determining the engagement color based on the largest ratio.

In Example 15, the subject matter of Examples 10-14 includes, wherein the behavior state is one of on-task or off-task.

In Example 16, the subject matter of Examples 13-15 includes, wherein the emotional state is one of satisfied, bored, or confused.

In Example 17, the subject matter of Examples 10-16 includes, calculating, using the APM, first features from the detected face based on a proper subset of face animation parameters; and calculating, using the APM, second features from the detected face based on movement of the detected face from previous video data, wherein the first features and the second features are used by the first emotional classifier and the second behavioral classifier.

In Example 18, the subject matter of Examples 10-17 includes, determining, using the CPM, a number of questions accessed in a previous context time period; and determining, using the CPM, a number of questions where a hint associated with a question was accessed in the previous context time period, wherein the number of questions and the number of questions where a hint associated with a question was accessed are used by the first behavioral classifier and the second behavioral classifier.

Example 19 is at least one non-transitory computer-readable medium including instructions for engagement dissemination, the computer-readable medium comprising instructions that, when executed by a machine, cause the machine to perform operations comprising: detecting a face in video data; determining a student is on-platform based on log data; determining a section type for the student based on the log data; selecting, using an appearance monitor (APM), a first emotional classifier specific to the section type; classifying, using the first emotional classifier, a first emotional component based on the detected face; selecting, using the APM, a first behavioral classifier specific to the section type; and classifying, using the first behavioral classifier, a first behavioral component based on the detected face; selecting, using a context-performance monitor (CPM), a second emotional classifier specific to the section type; classifying, using the second emotional classifier, a second emotional component based on the log data and the section type; selecting, using the CPM, a second behavioral classifier specific to the section type; and classifying, using the second behavioral classifier, a second behavioral component based on the log data and the section type; combining the classified first emotional component and the second emotional component into an emotional state of the student based on confidence values of the first emotional component and the second emotional component; combining the classified first behavioral component and the second behavioral component into a behavioral state of the student based on confidence values of the first behavioral component and the second behavioral component; and determining an engagement level of the student based on the emotional state of the student and the behavioral state of the student.

In Example 20, the subject matter of Example 19 includes, wherein the engagement level is one of engaged, may be engaged, or not engaged.

In Example 21, the subject matter of Example 20 includes, determining an engagement color based on the engagement level of the student; and displaying a student avatar, wherein the student avatar is colored the engagement color.

In Example 22, the subject matter of Example 21 includes, displaying an intervention alert for the student based on the engagement level of the student.

In Example 23, the subject matter of Examples 21-22 includes, wherein determining the engagement color comprises: determining a number of engagement levels for a previous time period; determining a number of engagement level for each possible engagement level of the student for a previous time period; calculating a ratio using the number of engagement levels and the number of engagement level for each possible engagement level; determining a largest ratio from the calculated ratios; and determining the engagement color based on the largest ratio.

In Example 24, the subject matter of Examples 19-23 includes, wherein the behavior state is one of on-task or off-task.

In Example 25, the subject matter of Examples 22-24 includes, wherein the emotional state is one of satisfied, bored, or confused.

In Example 26, the subject matter of Examples 19-25 includes, calculating, using the APM, first features from the detected face based on a proper subset of face animation parameters; and calculating, using the APM, second features from the detected face based on movement of the detected face from previous video data, wherein the first features and the second features are used by the first emotional classifier and the second behavioral classifier.

in Example 27, the subject matter of Examples 19-26 includes, determining, using the CPM, a number of questions accessed in a previous context time period; and determining, using the CPM, a number of questions where a hint associated with a question was accessed in the previous context time period, wherein the number of questions and the number of questions where a hint associated with a question was accessed are used by the first behavioral classifier and the second behavioral classifier.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus for engagement dissemination, the apparatus comprising:
   a hardware processor; and
   memory including instructions, which when executed by the hardware processor, cause the hardware processor to:
   detect in video data, a face of a student of a plurality of students in a classroom;
   determine that the student is on-platform based on log data;
   determine a section type for the student based on the log data, wherein the section type is one of an instructional section type or an assessment section type;
   select a first emotional classifier specific to the section type;
   classify, using the first emotional classifier, a first emotional component based on the detected face;
   select a first behavioral classifier specific to the section type;
   classify, using the first behavioral classifier, a first behavioral component based on the detected face;
   select a second emotional classifier specific to the section type;
   classify, using the second emotional classifier, a second emotional component based on the log data and the section type by using input derived from the log data to extract a set of features, the set of features including at least one of: a number of failed first attempts to a number of questions, a number of hints used within a time period, or an amount of time spent on a first attempt on answering questions in a topic;
   select a second behavioral classifier specific to the section type;
   classify, using the second behavioral classifier, a second behavioral component based on the log data and the section type;
   combine the classified first emotional component and the second emotional component into an emotional state of the student based on confidence values of the first emotional component and the second emotional component;

combine the classified first behavioral component and the second behavioral component into a behavioral state of the student based on confidence values of the first behavioral component and the second behavioral component;

determine an engagement level of the student based on the emotional state of the student and the behavioral state of the student; and display a student avatar representing the student in a user interface, the user interface including a plurality of student avatars that includes the student avatar, each of the plurality of student avatars representing a respective student in the classroom, wherein each of the plurality of student avatars are colored with an engagement color indicating a respective engagement level of the respective student.

2. The apparatus of claim 1, wherein the engagement level is one of engaged, may be engaged, or not engaged.

3. The apparatus of claim 2, further comprising instructions, which when executed by the hardware processor, cause the hardware processor to:

determine the engagement color based on the engagement level of the student.

4. The apparatus of claim 3, further comprising instructions, which when executed by the hardware processor, cause the hardware processor to display an intervention alert for the student based on the engagement level of the student.

5. The apparatus of claim 3, wherein to determine the engagement color, the instructions, which when executed by the hardware processor, cause the hardware processor to:

determine a number of engagement levels for a previous time period;

determine a number of engagement level for each possible engagement level of the student for a previous time period;

calculate a ratio using the number of engagement levels and the number of engagement level for each possible engagement level;

determine a largest ratio from the calculated ratios; and determine the engagement color based on the largest ratio.

6. The apparatus of claim 1, wherein the behavior state is one of on-task or off-task.

7. The apparatus of claim 4, wherein the emotional state is one of satisfied, bored, or confused.

8. The apparatus of claim 1, further comprising instructions, which when executed by the hardware processor, cause the hardware processor to:

calculate first features from the detected face based on a proper subset of face animation parameters; and calculate second features from the detected face based on movement of the detected face from previous video data, wherein the first features and the second features are used by the first emotional classifier and the second behavioral classifier.

9. The apparatus of claim 1, further comprising instructions, which when executed by the hardware processor, cause the hardware processor to:

determine a number of questions accessed in a previous context time period; and determine a number of questions where a hint associated with a question was accessed in the previous context time period, wherein the number of questions and the number of questions where a hint associated with a question was accessed are used by the first behavioral classifier and the second behavioral classifier.

10. A method for engagement dissemination, the method comprising operations performed using an electronic processor, the operations comprising:

detecting, in video data, a face of a student of a plurality of students in a classroom;

determining that the student is on-platform based on log data;

determining a section type for the student based on the log data, wherein the section type is one of an instructional section type or an assessment section type;

selecting, using an appearance monitor (APM), a first emotional classifier specific to the section type;

classifying, using the first emotional classifier, a first emotional component based on the detected face;

selecting, using the APM, a first behavioral classifier specific to the section type;

classifying, using the first behavioral classifier, a first behavioral component based on the detected face;

selecting, using a context-performance monitor (CPM), a second emotional classifier specific to the section type;

classifying, using the second emotional classifier, a second emotional component based on the log data and the section type;

selecting, using the CPM, a second behavioral classifier specific to the section type;

classifying, using the second behavioral classifier, a second behavioral component based on the log data and the section type by using input derived from the log data to extract a set of features, the set of features including at least one of: a number of failed first attempts to a number of questions, a number of hints used within a time period, or an amount of time spent on a first attempt on answering questions in a topic;

combining the classified first emotional component and the second emotional component into an emotional state of the student based on confidence values of the first emotional component and the second emotional component;

combining the classified first behavioral component and the second behavioral component into a behavioral state of the student based on confidence values of the first behavioral component and the second behavioral component;

determining an engagement level of the student based on the emotional state of the student and the behavioral state of the student; and displaying a student avatar representing the student in a user interface, the user interface including a plurality of student avatars that includes the student avatar, each of the plurality of student avatars representing a respective student in the classroom, wherein each of the plurality of student avatars are colored with an engagement color indicating a respective engagement level of the respective student.

11. The method of claim 10, wherein the engagement level is one of engaged, may be engaged, or not engaged.

12. The method of claim 11, further comprising:

determining the engagement color based on the engagement level of the student.

13. The method of claim 12, further comprising displaying an intervention alert for the student based on the engagement level of the student.

14. The method of claim 12, wherein determining the engagement color comprises:

determining a number of engagement levels for a previous time period;

determining a number of engagement level for each possible engagement level of the student for a previous time period;

calculating a ratio using the number of engagement levels and the number of engagement level for each possible engagement level;

determining a largest ratio from the calculated ratios; and determining the engagement color based on the largest ratio.

15. The method of claim 10, wherein the behavior state is one of on-task or off-task.

16. The method of claim 13, wherein the emotional state is one of satisfied, bored, or confused.

17. The method of claim 10, further comprising:

calculating, using the APM, first features from the detected face based on a proper subset of face animation parameters; and calculating, using the APM, second features from the detected face based on movement of the detected face from previous video data, wherein the first features and the second features are used by the first emotional classifier and the second behavioral classifier.

18. The method of claim 10, further comprising:

determining, using the CPM, a number of questions accessed in a previous context time period; and determining, using the CPM, a number of questions where a hint associated with a question was accessed in the previous context time period, wherein the number of questions and the number of questions where a hint associated with a question was accessed are used by the first behavioral classifier and the second behavioral classifier.

19. At least one non-transitory computer-readable medium including instructions for engagement dissemination, the computer-readable medium comprising instructions that, when executed by a machine, cause the machine to perform operations comprising:

detecting in video data, a face of a student of a plurality of students in a classroom;

determining that the student is on-platform based on log data;

determining a section type for the student based on the log data, wherein the section type is one of an instructional section type or an assessment section type;

selecting, using an appearance monitor (APM), a first emotional classifier specific to the section type;

classifying, using the first emotional classifier, a first emotional component based on the detected face;

selecting, using the APM, a first behavioral classifier specific to the section type;

classifying, using the first behavioral classifier, a first behavioral component based on the detected face;

selecting, using a context-performance monitor (CPM), a second emotional classifier specific to the section type;

classifying, using the second emotional classifier, a second emotional component based on the log data and the section type by using input derived from the log data to extract a set of features, the set of features including at least one of: a number of failed first attempts to a number of questions, a number of hints used within a time period, or an amount of time spent on a first attempt on answering questions in a topic;

selecting, using the CPM, a second behavioral classifier specific to the section type;

classifying, using the second behavioral classifier, a second behavioral component based on the log data and the section type;

combining the classified first emotional component and the second emotional component into an emotional state of the student based on confidence values of the first emotional component and the second emotional component;

combining the classified first behavioral component and the second behavioral component into a behavioral state of the student based on confidence values of the first behavioral component and the second behavioral component;

determining an engagement level of the student based on the emotional state of the student and the behavioral state of the student; and displaying a student avatar representing the student in a user interface, the user interface including a plurality of student avatars that includes the student avatar, each of the plurality of student avatars representing a respective student in the classroom, wherein each of the plurality of student avatars are colored with an engagement color indicating a respective engagement level of the respective student.

20. The at least one non-transitory computer-readable medium of claim 19, wherein the engagement level is one of engaged, may be engaged, or not engaged.

21. The at least one non-transitory computer-readable medium of claim 20, further comprising:

determining the engagement color based on the engagement level of the student.

22. The at least one non-transitory computer-readable medium of claim 21, further comprising displaying an intervention alert for the student based on the engagement level of the student.

23. The at least one non-transitory computer-readable medium of claim 21, wherein determining the engagement color comprises:

determining a number of engagement levels for a previous time period;

determining a number of engagement level for each possible engagement level of the student for a previous time period;

calculating a ratio using the number of engagement levels and the number of engagement level for each possible engagement level;

determining a largest ratio from the calculated ratios; and determining the engagement color based on the largest ratio.

24. The at least one non-transitory computer-readable medium of claim 19, wherein the behavior state is one of on-task or off-task.

25. The at least one non-transitory computer-readable medium of claim 22, wherein the emotional state is one of satisfied, bored, or confused.

26. The apparatus of claim 1, wherein the log data includes website access logs, system logs, or educational content logs.

* * * * *